US012743805B2

(12) United States Patent
Oshima et al.

(10) Patent No.: US 12,743,805 B2
(45) Date of Patent: Sep. 22, 2026

(54) PROCESSING SYSTEM, PROCESSING METHOD, AND STORAGE MEDIUM

(71) Applicant: KABUSHIKI KAISHA TOSHIBA, Tokyo (JP)

(72) Inventors: Hirotomo Oshima, Yokohama Kanagawa (JP); Yuta Shirakawa, Kawasaki Kanagawa (JP); Takanori Yoshii, Kawasaki Kanagawa (JP); Takehiro Kato, Yokohama Kanagawa (JP); Keisuke Nishimura, Fujisawa Kanagawa (JP); Yasuo Namioka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 416 days.

(21) Appl. No.: 18/157,355

(22) Filed: Jan. 20, 2023

(65) Prior Publication Data

US 2023/0245338 A1 Aug. 3, 2023

(30) Foreign Application Priority Data

Jan. 31, 2022 (JP) ................................ 2022-013403

(51) Int. Cl.
*G06K 9/00* (2022.01)
*G06T 7/11* (2017.01)
(Continued)

(52) U.S. Cl.
CPC .................. *G06T 7/70* (2017.01); *G06T 7/11* (2017.01); *G06T 7/13* (2017.01)

(58) Field of Classification Search
CPC ............. G06T 7/70; G06T 2207/30196; G06T 2207/30164; G06T 2207/30232; G06T 7/11; G06T 7/13; G06T 7/73
See application file for complete search history.

(56) References Cited

U.S. PATENT DOCUMENTS 10,803,292 B2 * 10/2020 Srivastava ............ H04N 23/60
11,113,541 B2 * 9/2021 Datar .................... H04N 7/183
(Continued)

FOREIGN PATENT DOCUMENTS

CN 104063677 A 9/2014
CN 104850219 A 8/2015
(Continued)

OTHER PUBLICATIONS

First Examination Report received in Indian Patent Application No. 202314003822, dated May 24, 2024.
(Continued)

*Primary Examiner* — Hadi Akhavannik
(74) *Attorney, Agent, or Firm* — Knobbe, Martens, Olson & Bear, LLP

(57) ABSTRACT

According to one embodiment, a processing system estimates a pose of a worker, a position of an article, an orientation of the article, and a state of the article based on an image of the worker and the article. The processing system further estimates a work spot of the worker on the article based on an estimation result of the pose, an estimation result of the position, and an estimation result of the orientation. The processing system further estimates a task performed by the worker based on an estimation result of the work spot and an estimation result of the state.

18 Claims, 28 Drawing Sheets

(51) Int. Cl.
*G06T 7/13* (2017.01)
*G06T 7/70* (2017.01)

(56) References Cited

U.S. PATENT DOCUMENTS

| | | | | |
|---|---|---|---|---|
| 11,216,656 | B1 * | 1/2022 | Zia | G06N 3/04 |
| 2016/0057395 | A1 * | 2/2016 | Yuki | G06V 40/10 348/222.1 |
| 2017/0132780 | A1 | 5/2017 | Namioka et al. | |
| 2018/0196585 | A1 * | 7/2018 | Densham | H04N 9/31 |
| 2018/0253861 | A1 * | 9/2018 | Moteki | G06T 7/174 |
| 2019/0065823 | A1 * | 2/2019 | Srivastava | G06V 20/653 |
| 2019/0193947 | A1 | 6/2019 | Koga | |
| 2019/0213406 | A1 * | 7/2019 | Porikli | G06V 20/597 |
| 2021/0052288 | A1 * | 2/2021 | Couture | A61B 17/1675 |
| 2021/0124944 | A1 * | 4/2021 | Datar | G06T 7/215 |
| 2021/0169581 | A1 * | 6/2021 | Calloway | A61B 34/74 |
| 2021/0383594 | A1 * | 12/2021 | Tang | G06F 1/163 |
| 2022/0066544 | A1 * | 3/2022 | Kwon | G06V 20/41 |
| 2022/0189194 | A1 | 6/2022 | Kim | |

FOREIGN PATENT DOCUMENTS

| | | | |
|---|---|---|---|
| CN | 109955222 | A | 7/2019 |
| JP | 2017-091249 | | 5/2017 |
| JP | 2020-177680 | A | 10/2020 |
| JP | 2020-184250 | | 11/2020 |
| JP | 6854959 | B1 | 4/2021 |
| WO | WO 2017/222070 | | 12/2017 |
| WO | WO 2018/087844 | | 5/2018 |
| WO | WO 2022/009305 | A1 | 1/2022 |

OTHER PUBLICATIONS

Office Action issued in Japanese Patent Application No. 2022-013403, dated Jun. 25, 2025 in 10 pages.

Office Action issued in Chinese Patent Application No. 202310088463.7, dated Nov. 19, 2025 in 16 pages.

* cited by examiner

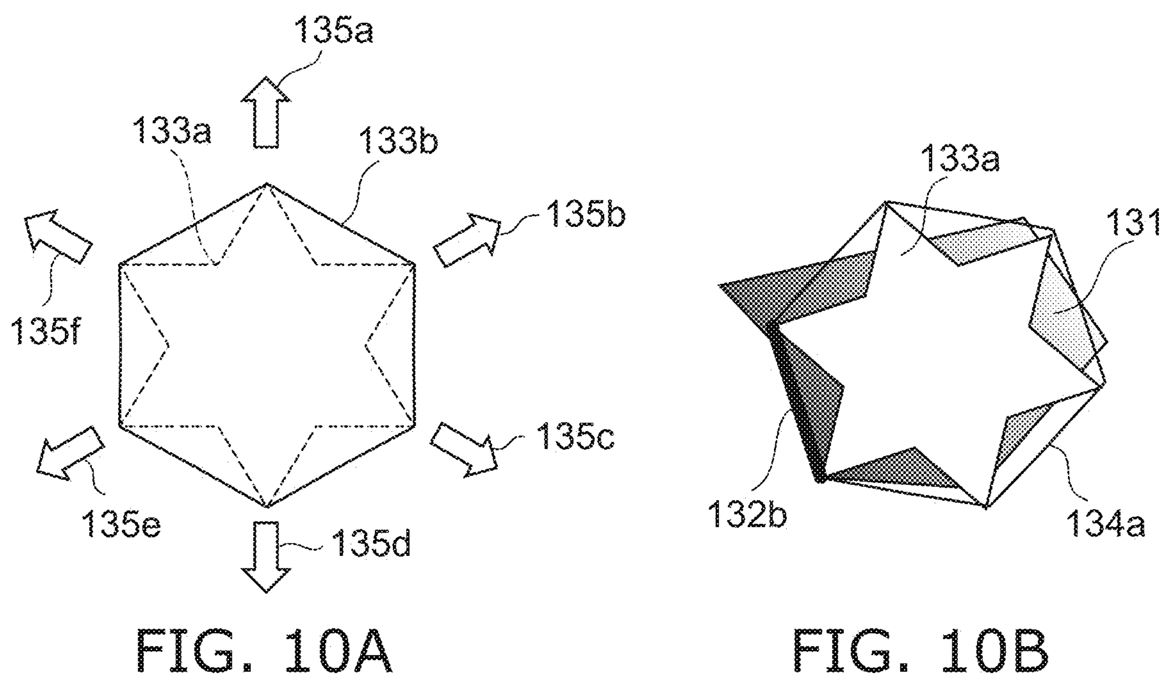
FIG. 10A
FIG. 10B
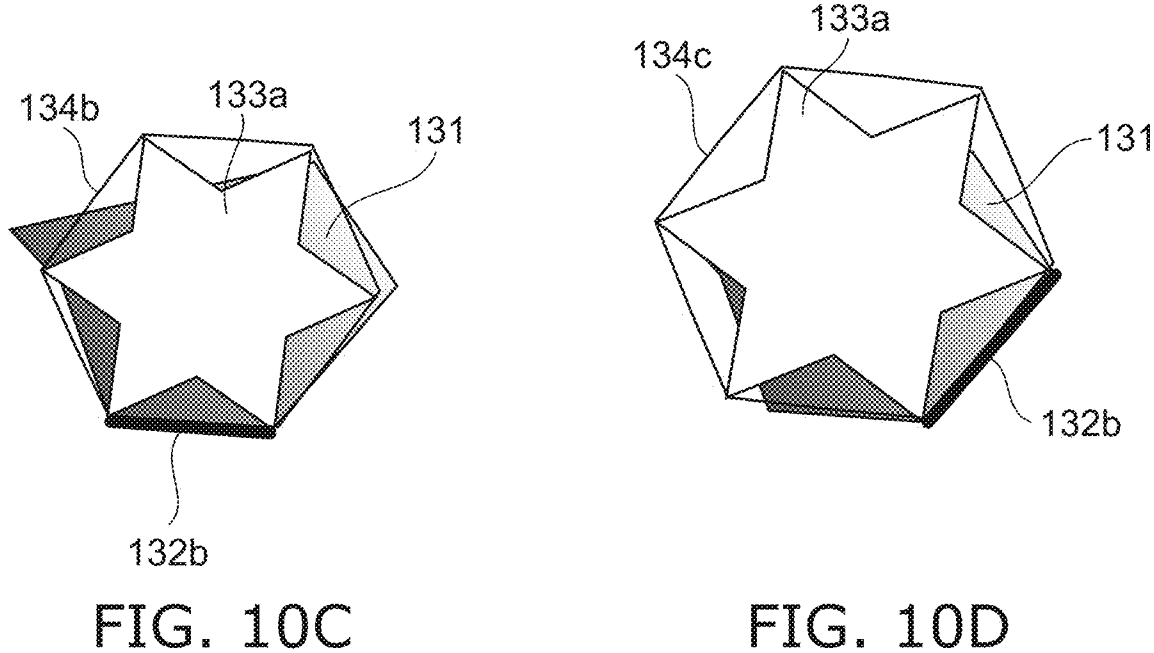
FIG. 10C
FIG. 10D

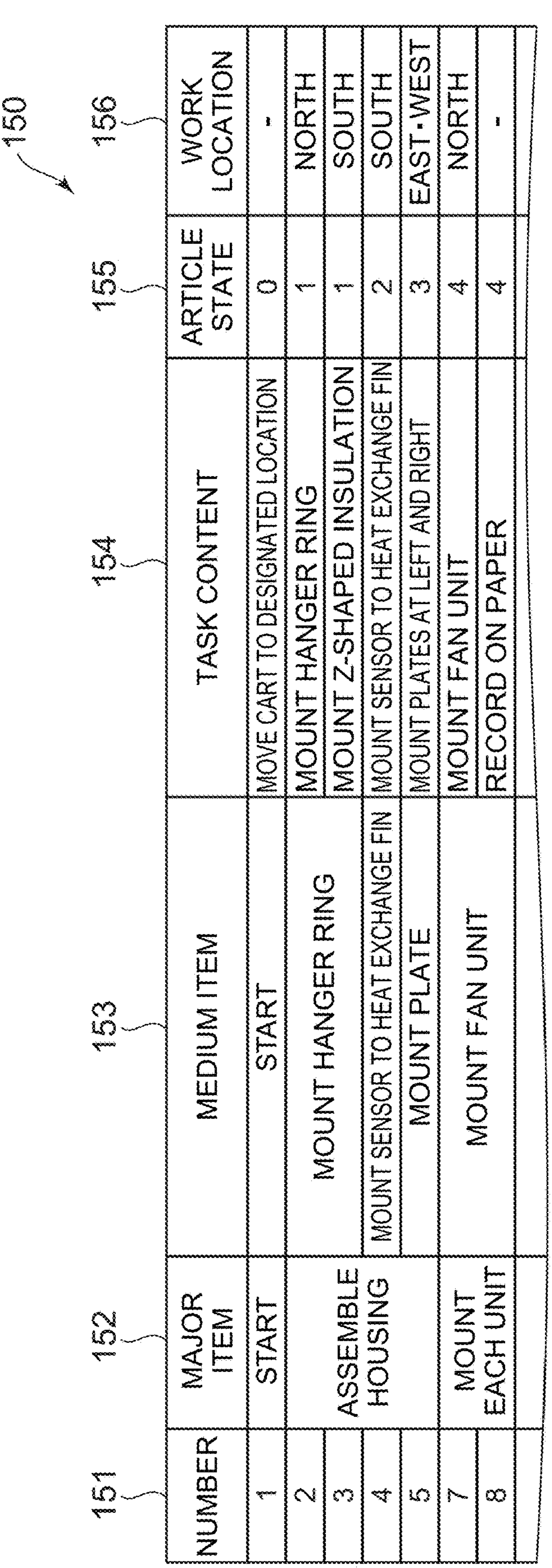

| NUMBER | MAJOR ITEM | MEDIUM ITEM | TASK CONTENT | ARTICLE STATE | WORK LOCATION |
|---|---|---|---|---|---|
| 1 | START | START | MOVE CART TO DESIGNATED LOCATION | 0 | - |
| 2 | ASSEMBLE HOUSING | MOUNT HANGER RING | MOUNT HANGER RING | 1 | NORTH |
| 3 | | | MOUNT Z-SHAPED INSULATION | 1 | SOUTH |
| 4 | | MOUNT SENSOR TO HEAT EXCHANGE FIN | MOUNT SENSOR TO HEAT EXCHANGE FIN | 2 | SOUTH |
| 5 | | MOUNT PLATE | MOUNT PLATES AT LEFT AND RIGHT | 3 | EAST・WEST |
| 7 | MOUNT EACH UNIT | MOUNT FAN UNIT | MOUNT FAN UNIT | 4 | NORTH |
| 8 | | | RECORD ON PAPER | 4 | - |

FIG. 22

PROCESSING SYSTEM, PROCESSING METHOD, AND STORAGE MEDIUM

CROSS-REFERENCE TO RELATED APPLICATIONS

This application is based upon and claims the benefit of priority from Japanese Patent Application No. 2022-013403, filed on Jan. 31, 2022; the entire contents of which are incorporated herein by reference.

FIELD

Embodiments described herein relate generally to a processing system, a processing method, and a storage medium.

BACKGROUND

There is a system that automatically estimates a task being performed. Technology of the system that can estimate the task in more detail is desirable.

BRIEF DESCRIPTION OF THE DRAWINGS

FIGS. 10A to 10D illustrate processing according to the processing system according to the embodiment;

FIG. 22 is an example of the task database;

DETAILED DESCRIPTION

Figure 1:
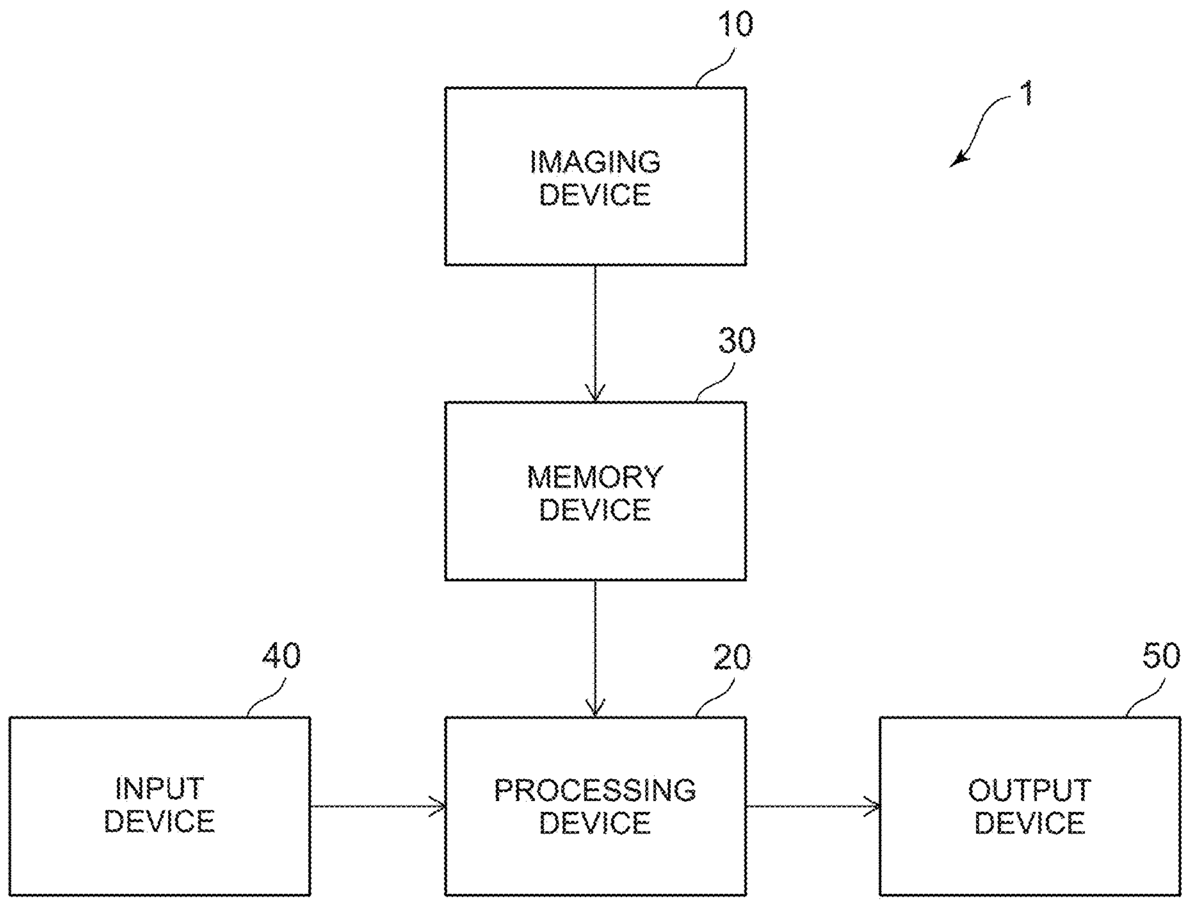
FIG. 1 is a schematic view showing a configuration of a processing system according to an embodiment.

According to one embodiment, a processing system estimates a pose of a worker, a position of an article, an orientation of the article, and a state of the article based on an image of the worker and the article. The processing system further estimates a work spot of the worker on the article based on an estimation result of the pose, an estimation result of the position, and an estimation result of the orientation. The processing system further estimates a task performed by the worker based on an estimation result of the work spot and an estimation result of the state.

Various embodiments are described below with reference to the accompanying drawings. In the specification and drawings, components similar to those described previously or illustrated in an antecedent drawing are marked with like reference numerals, and a detailed description is omitted as appropriate.

FIG. 1 is a schematic view showing a configuration of a processing system according to an embodiment.

The processing system according to the embodiment is used to estimate a task performed by a worker based on an image. As shown in FIG. 1, the processing system 1 includes an imaging device 10, a processing device 20, a memory device 30, an input device 40, and an output device 50.

Figure 2A:
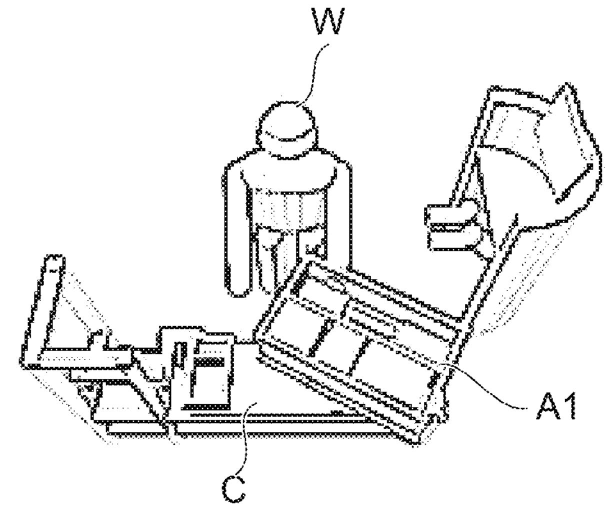
FIG. 2A is a schematic view showing a worker and an article.
Figure 2B:
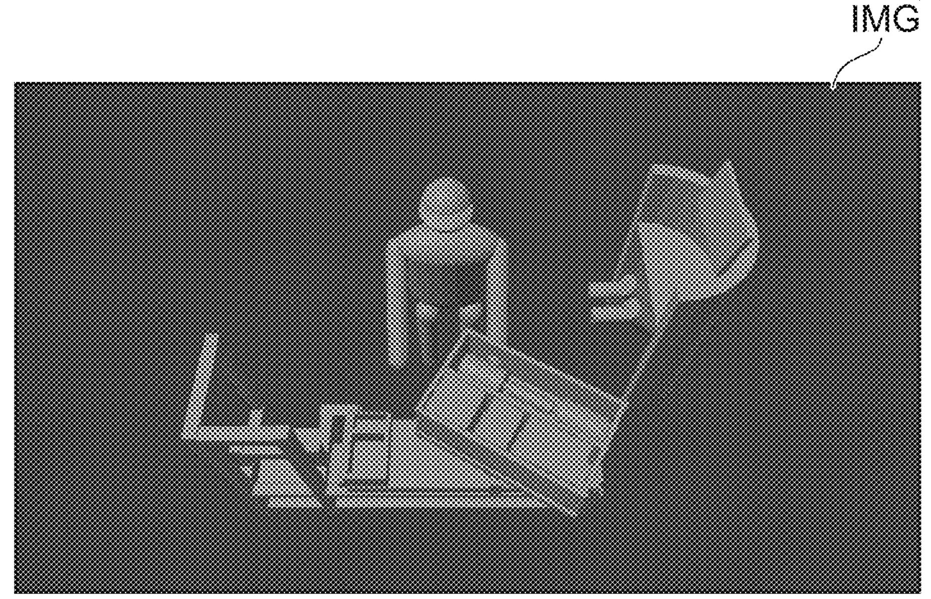
FIG. 2B shows an example of an image acquired by the imaging device.

FIG. 2A is a schematic view showing a worker and an article. FIG. 2B shows an example of an image acquired by the imaging device.

The processing of the processing system 1 will now be elaborated. For example, as shown in FIG. 2A, an article A1 is located on a carrying platform C. A worker W performs a predetermined task on the article A1. The article A1 is a semifinished product, a unit used in a product, etc. The imaging device 10 acquires an image by imaging the worker W and the article A1. FIG. 2B shows an image IMG acquired by the imaging device 10.

Favorably, the imaging device 10 is mounted to a wall, a ceiling, etc., and images the worker W and the article A1 from above. The worker W and the article A1 are easily imaged thereby. The orientation of the imaging by the imaging device 10 may be directly downward or may be tilted with respect to the vertical direction. The imaging device 10 repeatedly acquires images. Or, the imaging device 10 may acquire a video image. In such a case, still images are repeatedly cut out from the video image. The imaging device 10 stores the images or the video image in the memory device 30.

The processing device 20 accesses the memory device 30 and acquires the image acquired by the imaging device 10. The processing device 20 estimates the pose of the worker W, the position of the article A1, the orientation of the article A1, and the state of the article A1 based on the image. The processing device 20 also estimates the work spot of the worker W on the article A1 based on the pose, the position, and the orientation. Then, the processing device 20 estimates the task performed by the worker W based on the work spot and the state.

Other than images and video images, the memory device 30 stores data necessary for the processing of the processing device 20. The input device 40 is used by a user to input data to the processing device 20. The processing device 20 causes the output device 50 to output the data obtained by the processing so that the user can recognize the data.

Figure 3:
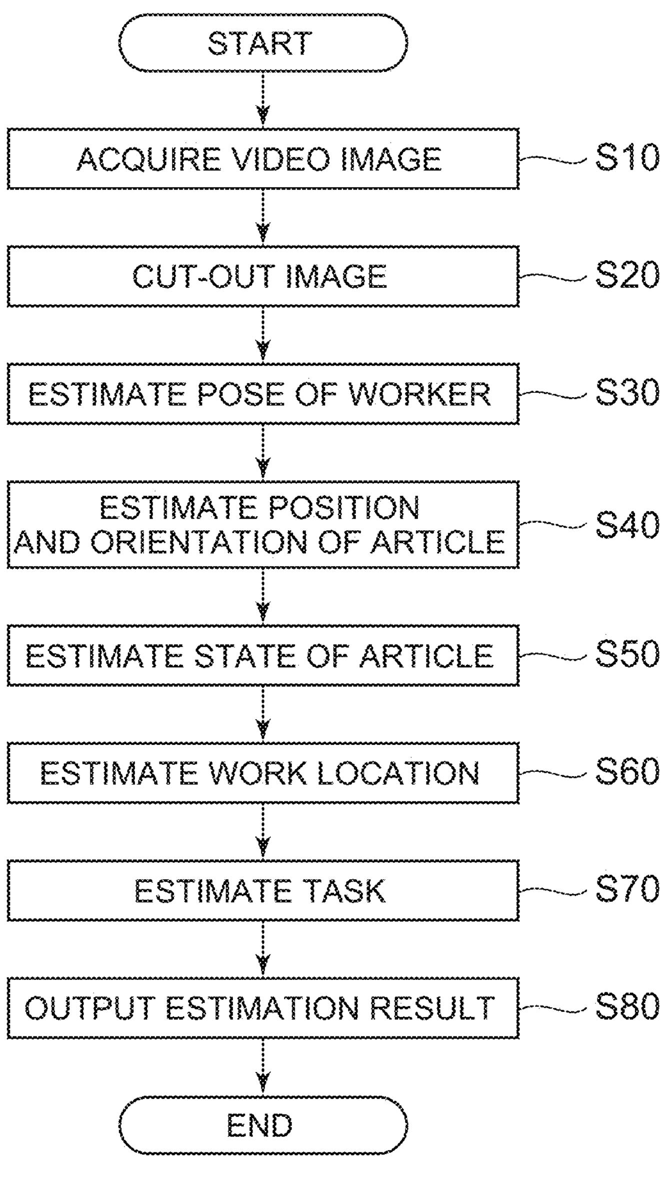
FIG. 3 is a flowchart showing an example of an operation of the processing system according to the embodiment.

FIG. 3 is a flowchart showing an example of an operation of the processing system according to the embodiment.

An overview of the operation of the processing system according to the embodiment will now be described with reference to FIG. 3. The imaging device 10 acquires a video image by imaging a worker and an article (step S10). The processing device 20 cuts out an image from the video image (step S20). The processing device 20 estimates the pose of the worker based on the image (step S30). The processing device 20 estimates the position and orientation of the article based on the image (step S40). The processing device 20 estimates the state of the article based on the image (step S50). The processing device 20 estimates the work spot on the article based on the pose of the worker, the position of the article, and the orientation of the article (step S60). The processing device 20 estimates the task being performed based on the state of the article and the work spot (step S70). The processing device 20 outputs the estimation result (step S80).

The processing performed by the processing device 20 will now be described in detail.

Pose Estimation

The processing device 20 estimates the pose of the worker W based on an image of the worker. For example, the processing device 20 inputs the image to a pose estimation model prepared beforehand. The pose estimation model is pretrained to estimate the pose of a person in an image according to the input of the image. The processing device 20 acquires an estimation result of the pose estimation model. For example, the pose estimation model includes a neural network. It is favorable for the pose estimation model to include a convolutional neural network (CNN). OpenPose, DarkPose, CenterNet, etc., can be used as the pose estimation model.

Position and Orientation Estimation

The processing device 20 extracts two images at different imaging times from among multiple images. The processing device 20 estimates movement information based on the two images. The movement information indicates the movement of an object between the one image and the other image. For example, dense optical flow is calculated as the movement information. The method for calculating the dense optical flow is arbitrary; recurrent all-pairs field transforms (RAFT), total variation (TV)-L1, etc., can be used.

FIGS. 4A to 10D illustrate processing according to the processing system according to the embodiment.

Figure 4A:
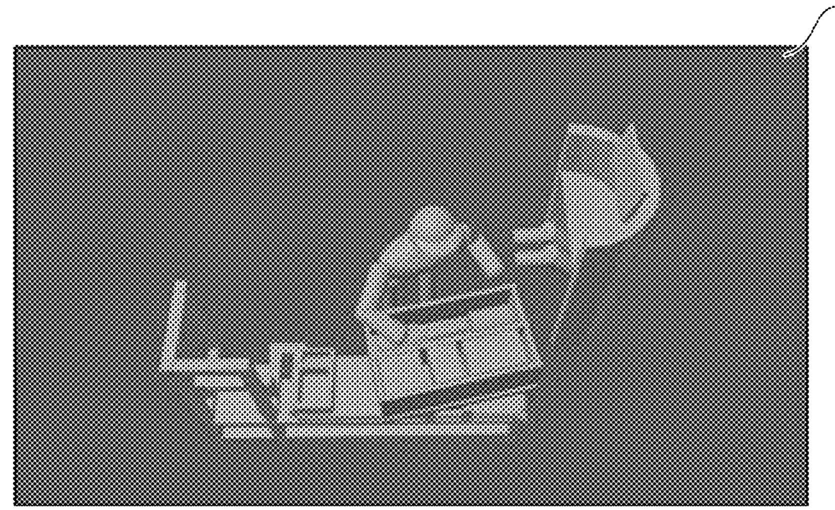
FIGS. 4A to 4C illustrate processing according to the processing system according to the embodiment.
Figure 4B:
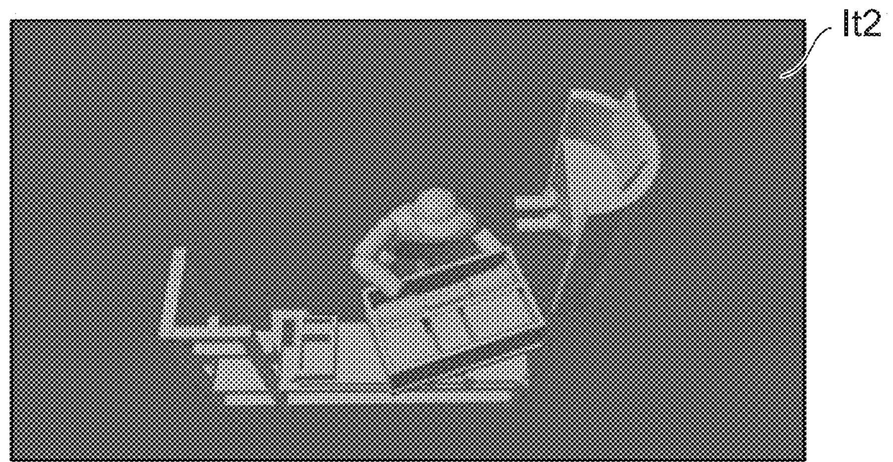
Figure 4C:
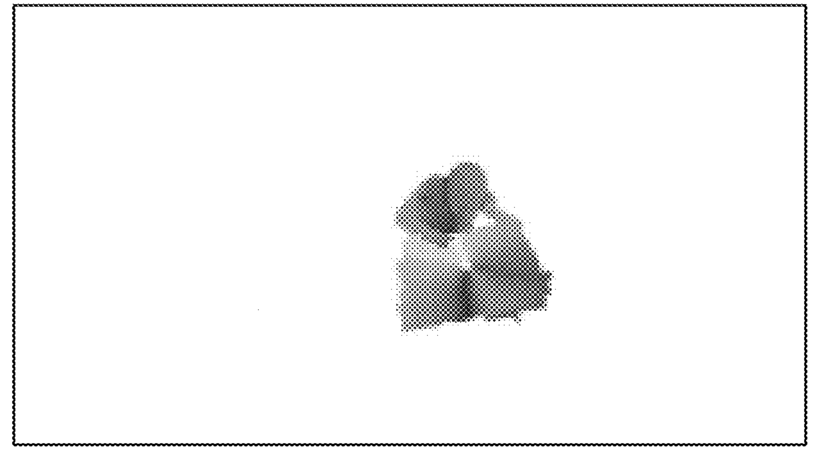

FIG. 4A shows an image It1 imaged at a time t1. FIG. 4B shows an image It2 imaged at a time t2. The time t2 is after the time t1. FIG. 4C shows movement information from the image It1 toward the image It2 and is calculated by the processing device 20. In a normal task, mainly, the worker and articles that are related to the task move. When workers, articles, and the like that are related to another task are not in the image, the movement information indicates a region in the image in which the worker and the article are imaged. Herein, a part of the image including the worker and the article indicated by the movement information is called a "partial region".

The movement information that is used to estimate the position of the article may include the movement of the worker, tools and jigs other than the article, etc. However, the shapes of such tools, the appearance of such tools in the movement information, the shapes of the worker and the article, and the appearance of the worker and the article in the movement information are sufficiently different. Therefore, as described below, by using a "sureness" related to the shape or position of the article, the effects of the movement of tools, jigs, etc., on the estimation of the position of the article can be sufficiently reduced.

The result of the pose estimation described above shows a region in the image in which the worker is visible. Herein, the region shown by the result of the pose estimation in which the worker is visible is called a "worker region". The processing device 20 estimates the worker region in the image based on the result of the pose estimation. The processing device 20 uses the worker region as a mask to remove the worker region from the movement information. Only the movement information of the article is obtained thereby. The movement information of the article indicates a region in the image in which the article is visible. Herein, the region indicated by the movement information of the article in which the article is visible is called an "article region". The article region is estimated from the movement information of the article.

Figure 5A:
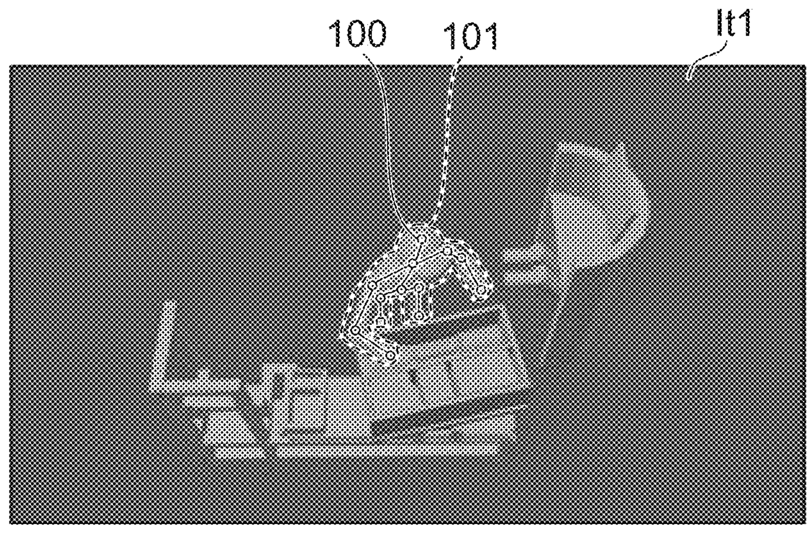
FIGS. 5A to 5C illustrate processing according to the processing system according to the embodiment.
Figure 5B:
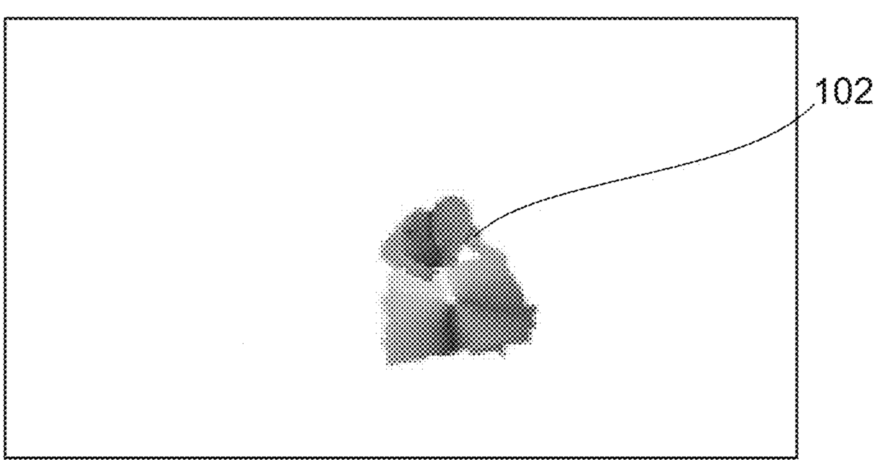
Figure 5C:
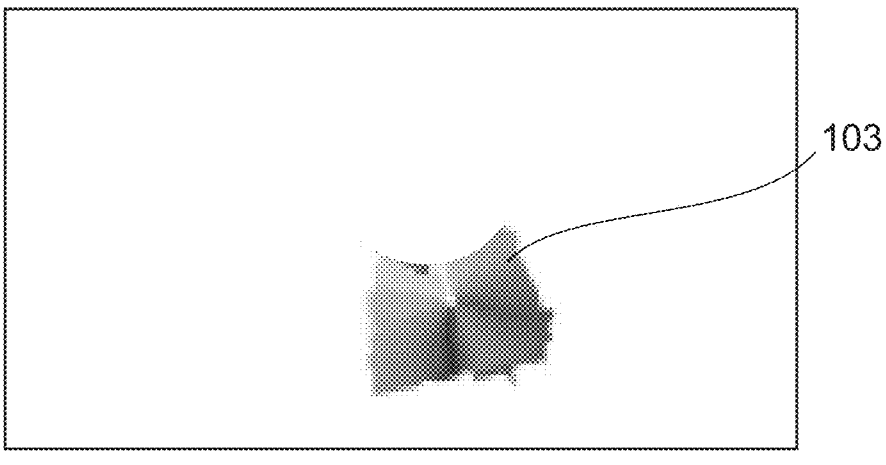

FIG. 5A shows the result of the pose estimation for the image It1 shown in FIG. 4A. The positions of multiple joints 100 are estimated by the pose estimation. As shown in FIG. 5A, a worker region 101 is specified from the result of the pose estimation. FIG. 5B shows movement information 102 from the time t1 to the time t2. The movement information of the article shown in FIG. 5C is obtained by using the worker region 101 as a mask to exclude a part of FIG. 5B. The movement information of the article indicates an article region 103 in the image It1 in which the article is visible.

The processing device 20 copies the movement information shown in FIG. 5C. The processing device 20 obtains a two-dimensional correlation coefficient map by calculating the correlation coefficient with the copied movement information while shifting the position of the movement information upward, downward, leftward, and rightward. The processing device 20 estimates the coordinate at which the maximum correlation coefficient in the correlation coefficient map is obtained as the center of the article region. Preprocessing of the copied movement information may be performed when determining the correlation coefficient. For example, the center coordinate of an article translating vertically, an article translating laterally, or a rotating article may be obtained by a vertical inversion, a lateral inversion, or a vertical and lateral inversion of the copied movement information. The preprocessing of the copied movement information is not limited to such preprocessing.

The processing device 20 estimates contour points of the article by scanning at uniform spacing in N directions from the center of the article region. For example, the point in the correlation coefficient map at which the value initially decreases is employed as a contour point. N contour points are obtained thereby. As an example, N is set to 36.

The processing device 20 extracts n contour points from the N contour points. The value n is less than the value N. For example, the processing device 20 uses a greedy algorithm to extract the n contour points. In the greedy algorithm, the angle between the contour point of interest and its adjacent contour point is calculated. The processing device 20 calculates the angle between adjacent contour points for each contour point. The processing device 20 extracts the n contour points in order of increasing angle. For example, when the shape of the article when viewed from above is equal to a m-gon or can be approximated by a m-gon, the value m is set as the value n. When the article is circular, the angles between adjacent contour points are substantially equal. In such a case, the value n may be equal to the value N. In other words, the processing of extracting the n contour points may be omitted.

Figure 6A:
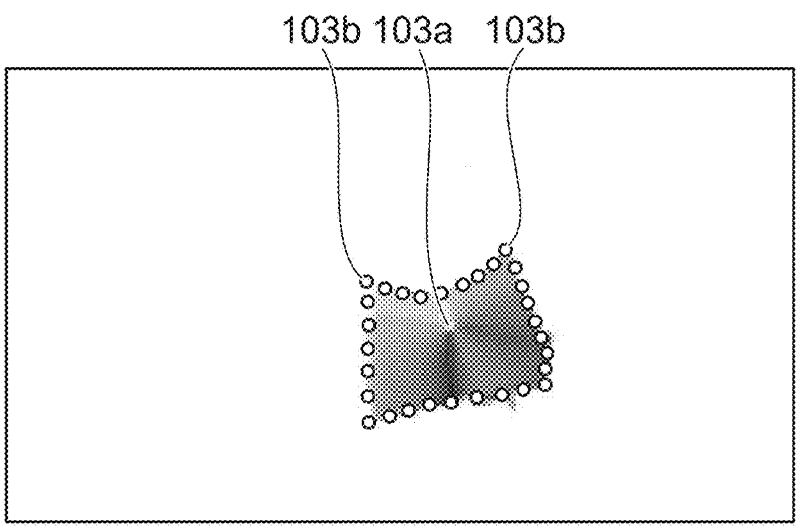
FIGS. 6A to 6C illustrate processing according to the processing system according to the embodiment.
Figure 6B:
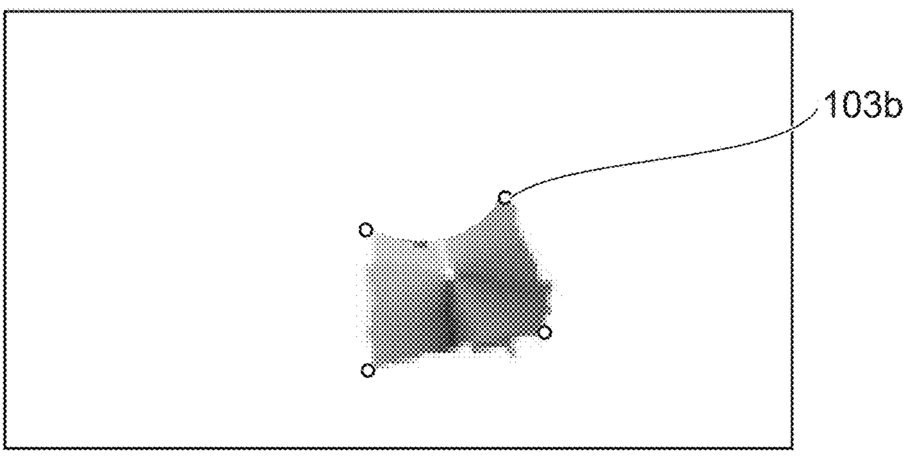

FIG. 6A shows the results of estimating a center 103*a* and setting N contour points 103*b* for the article region 103 shown in FIG. 5C. In the example, N is set to 30. Therefore, the thirty contour points 103*b* are set. In the example shown in FIGS. 5C and 6A, the article A1 is rectangular. The angles between adjacent contour points are small at the corners of the rectangle. As shown in FIG. 6B, the processing device 20 extracts four contour points 103*b* corresponding to the corners of the rectangle based on the thirty contour points. The contour of the article A1 is estimated by connecting the four contour points 103*b*.

The processing device 20 uses the n contour points to search for the polygon having the highest sureness as the shape of the article. Specifically, the processing device 20 depicts a preset article shape referenced to one of the n sides. The sureness of the position of the depicted shape is calculated based on the estimated contour. The processing device 20 calculates the surenesses by depicting the shape referenced to each side. The processing device 20 employs the position of the shape at which the largest sureness was obtained as the position of the shape of the article A1 in the image.

Figure 6C:
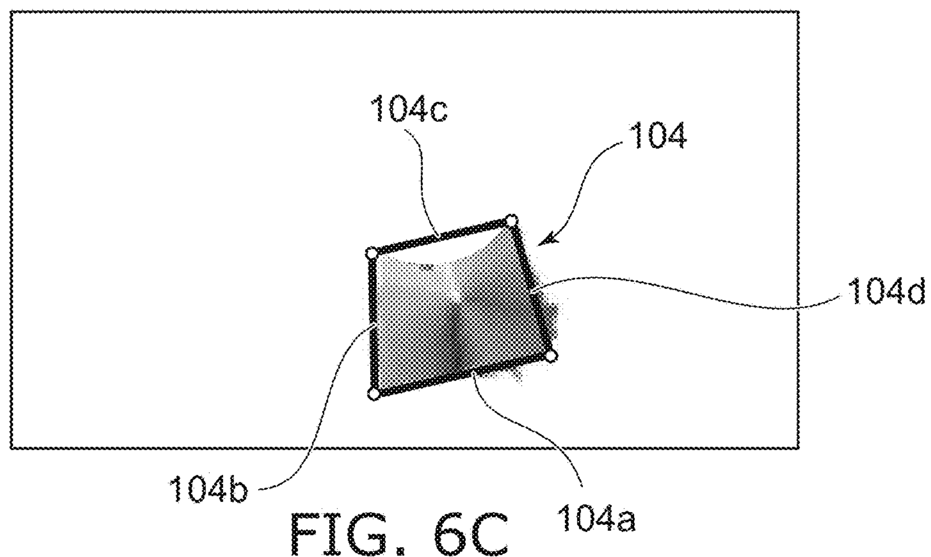
Figures 7A, 7B, 7C, 7D:
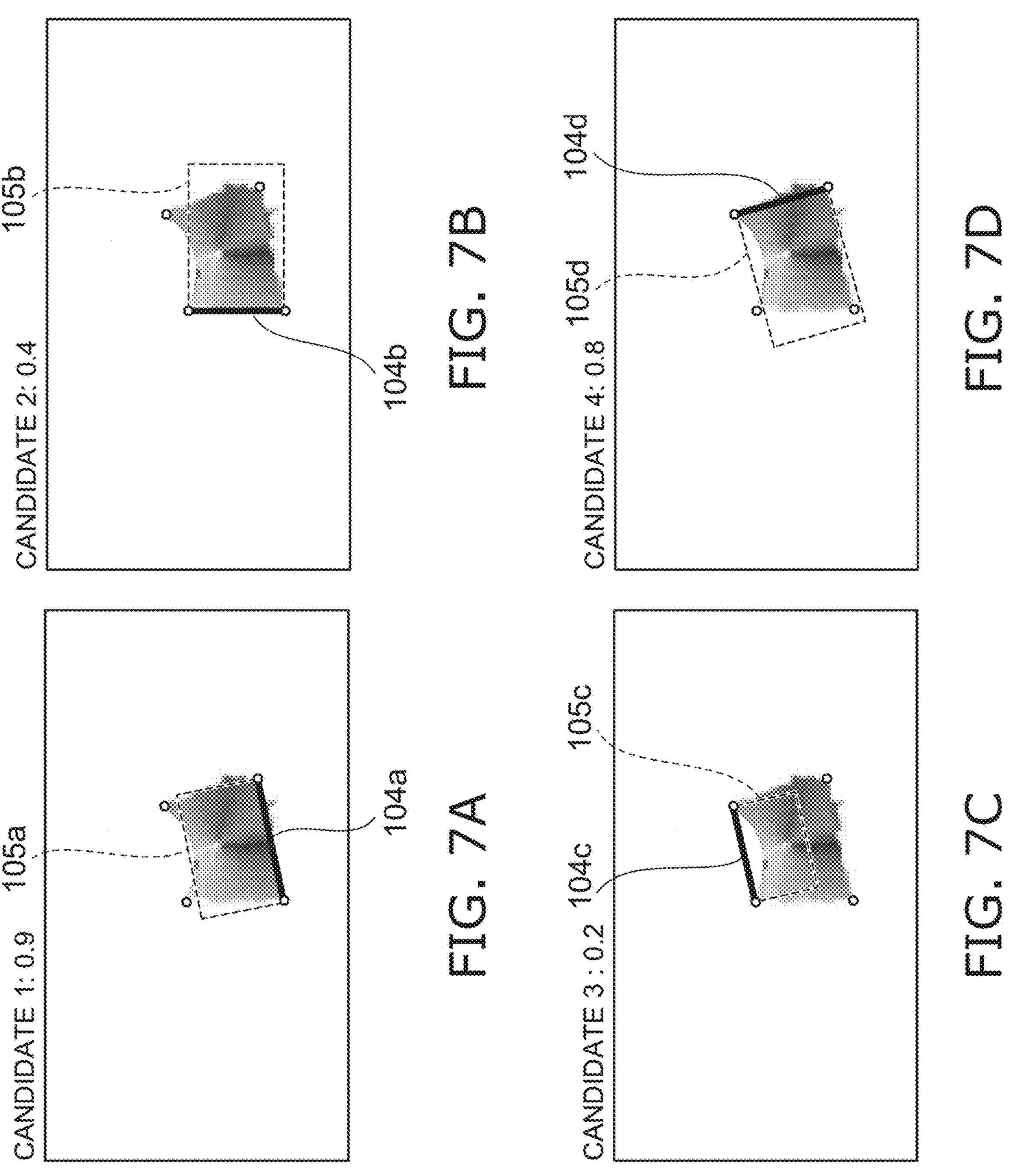
FIGS. 7A to 7D illustrate processing according to the processing system according to the embodiment.

As shown in FIG. 6C, a rectangle 104 that is based on the contour points 103*b* assumed based on FIG. 6B includes the four sides 104*a* to 104*d*. FIG. 7A shows the result of depicting a preset rectangle referenced to the side 104*a*. Similarly, FIGS. 7B to 7D show the results of depicting the preset rectangle referenced to the sides 104*b* to 104*d*.

The processing device 20 calculates the likelihoods between the rectangle 104 shown in FIG. 6C and rectangles 105*a* to 105*d* shown in FIGS. 7A to 7D as the surenesses of the rectangles 105*a* to 105*d*. The average value of the obtained correlation coefficient map inside the rectangle is used as the likelihood. As an example, the likelihoods of the rectangles 105*a* to 105*d* shown in FIGS. 7A to 7D are calculated respectively as “0.9”, “0.4”, “0.2”, and “0.8”. The processing device 20 employs the rectangle 105*a* for which the maximum likelihood is obtained. Or, in the calculation of the likelihoods, images referenced to the rectangles 105*a* to 105*d* may be cut out. The processing device 20 may input the images to a model for state classification described below and may acquire the certainties of the classification results as the likelihoods.

The processing device 20 employs the position of the shape for which the maximum likelihood is obtained as the position of the shape of the article at the time at which one of the two images was imaged. The processing device 20 calculates the coordinate of the position of the article based on the shape that is employed. For example, the processing device 20 uses the center coordinate of the employed shape as the article position. Or, the article position may be calculated from the employed shape according to a preset condition. The processing device 20 outputs the coordinate as the estimation result of the position of the article.

It is favorable for the imaging times of the two images used to estimate the movement information to be separated enough that the movement of the worker or the article is apparent. As an example, the imaging device 10 acquires a video image at 25 fps. Therefore, when images that have adjacent imaging times are extracted, the imaging time difference is 1/25 seconds. The movement of the worker or the article does not easily appear in 1/25 seconds. The effects of noise and the like in the image increase, and erroneous movement information is easily generated. For example, it is favorable for the imaging time difference between the two images used to estimate the movement information to be greater than 1/20 seconds and less than 1/2 seconds.

The sampling rate of the video image acquired by the imaging device 10 may be dynamically changed. For example, the sampling rate is increased when the movement of the worker or the article is fast. The change of the speed can be determined based on the size of the directly-previous optical flow and the size of the pose coordinate difference of the estimated worker.

The orientation of the article is determined based on the rotation amount of the article with respect to the initial state. For example, the position of the article is estimated from the initial image, and then the orientation with respect to the article is set. Each time the position of the article is estimated, the processing device 20 calculates the rotation amount of the estimated position with respect to the directly-previous estimation result of the position. For example, template matching is used to calculate the rotation amount. Specifically, the image that is cut out based on the directly-previous estimation result of the position is used as a template. The similarity with the template is calculated while rotating the image cut out based on the estimated position. The angle at which the maximum similarity is obtained corresponds to the rotation amount of the article.

When performing template matching, it is favorable to search for a rotation amount around the directly-previous estimation result. The calculation amount can be reduced thereby. The luminance value difference between corresponding points in the images may be compared to a preset threshold. When the difference is less than the threshold, it is determined that a change has not occurred between the points. A misjudgment in the template matching can be suppressed thereby.

Figure 8A:
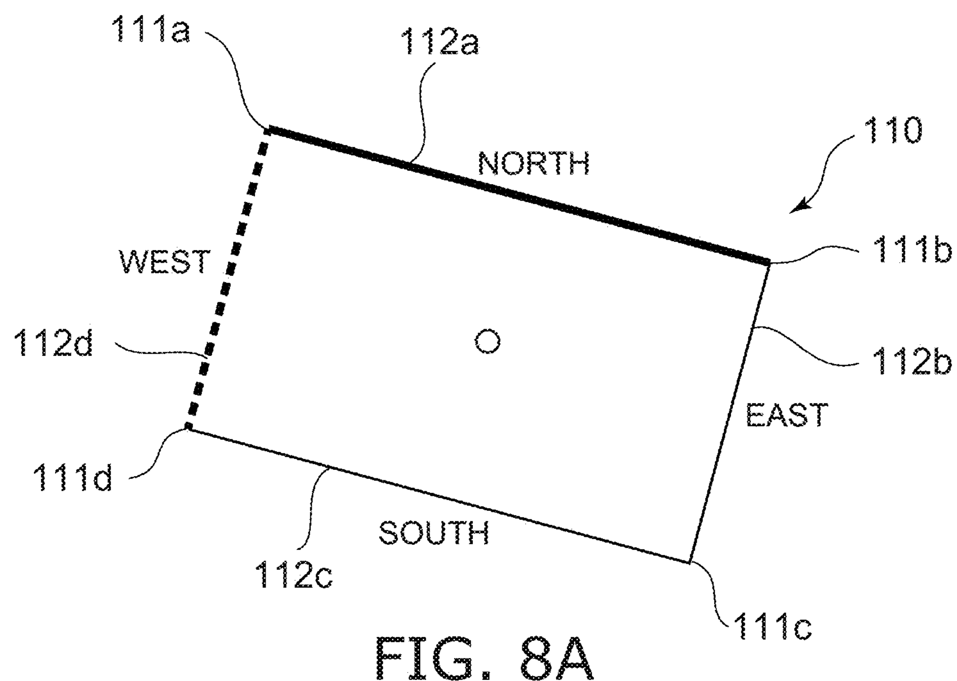
FIGS. 8A and 8B illustrate processing according to the processing system according to the embodiment.
Figure 8B:
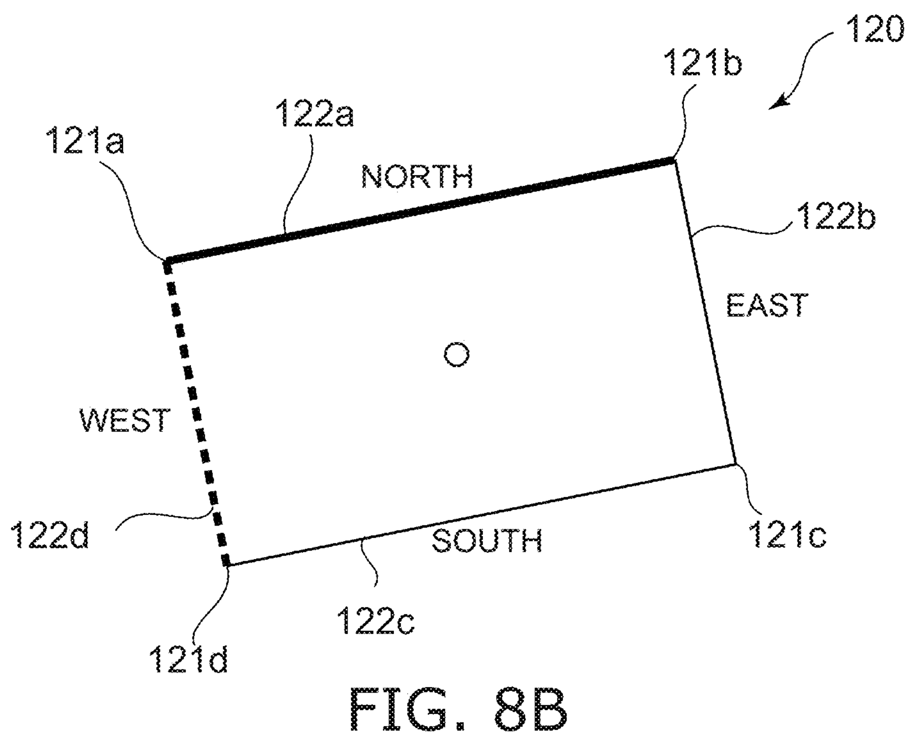

FIG. 8A shows the position of the article estimated at an initial time t11. In the example of FIG. 8A, a rectangle 110 that includes corners 111*a* to 111*d* is estimated. “North”, “east”, “south”, and “west” that indicate the orientations are set for sides 112*a* to 112*d* between the corners 111*a* to 111*d*. “North” and “west” are respectively illustrated by a thick solid line and a thick broken line. FIG. 8B shows the estimation result of the position at a time t12 after the time t11. A rectangle 120 that includes corners 121*a* to 121*d* and sides 122*a* to 122*d* is estimated. The sides 122*a* to 122*d* are estimated to correspond respectively to the sides 112*a* to 112*d* based on the history of the rotation amount of the article calculated from the time t11 to the time t12. Thereby, "north", "east", "south", and "west" that correspond respectively to the orientations of the sides 112*a* to 112*d* are set respectively for the sides 122*a* to 122*d*.

The position and orientation of the article are estimated by the processing described above. Here, an example is described in which the article is rectangular. Even when the shape of the article is not rectangular, the position and orientation of the article can be estimated by a similar technique.

Figure 9A:
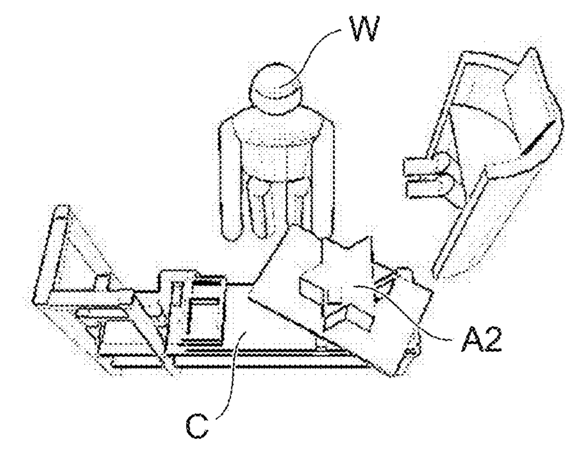
FIGS. 9A to 9C illustrate processing according to the processing system according to the embodiment.
Figure 9B:
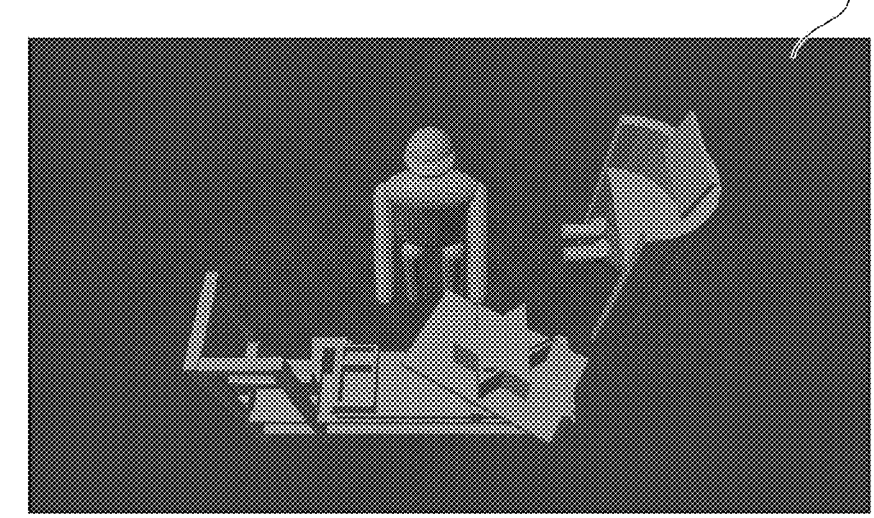
Figure 9C:
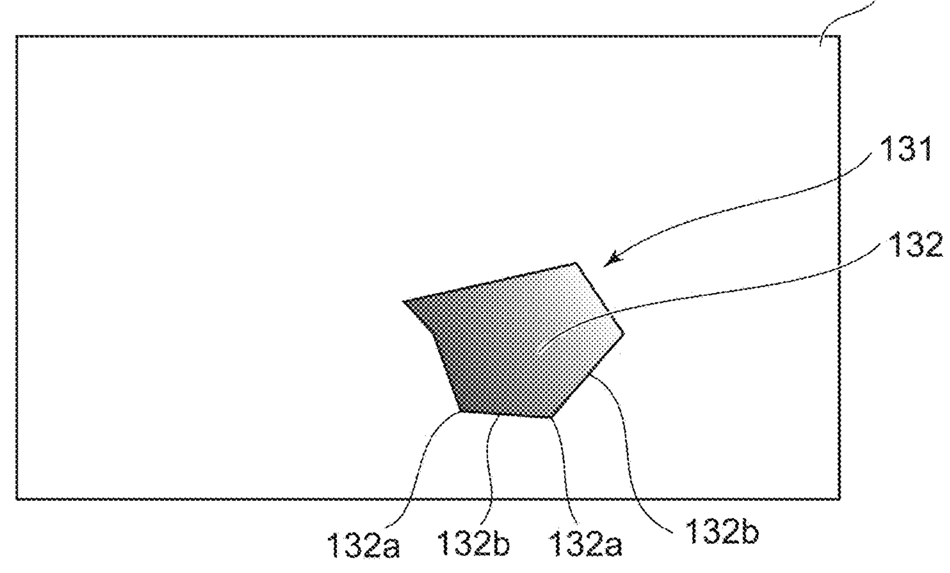

In the example of FIG. 9A, the worker W performs a task on a star-shaped (equilateral hexagram) article A2. FIG. 9B shows an image obtained by imaging the state of FIG. 9A. The processing device 20 uses an image 130 shown in FIG. 9B and another image to estimate an article region 131 shown in FIG. 9C. In the example, the article region 131 is a hexagon 132 that includes six contour points 132*a* and six sides 132*b*. As shown in FIG. 9C, there are cases where the article region does not correspond to the actual shape of the article due to the shape of the article and the movements of the worker and the article.

As shown in FIG. 10A, a star shape 133*a* is preset as the shape of the article A2. Also, a hexagon 133*b* is preset as a shape corresponding to the star shape 133*a*. The processing device 20 depicts the preset hexagon 133*b* referenced to the sides 132*b* of the hexagon 132. Six hexagons that are respectively based on the six sides 132*b* are depicted thereby. FIGS. 10B to 10D illustrate some of the six hexagons, namely, hexagons 134*a* to 134*c*. The processing device 20 calculates the likelihood of each of the six hexagons. The processing device 20 depicts the star shape 133*a* referenced to the hexagon for which the maximum likelihood was obtained. The processing device 20 employs the depicted star shape 133*a* as the shape of the article.

Thereafter, the estimated shape is used to estimate the position and the orientation. The amount of information set to indicate the orientation of the article is arbitrary. In the example of the rectangle shown in FIGS. 8A and 8B, four pieces of information (north, east, south, and west) are used to indicate the orientation of the article. For the star-shaped article A2 shown in FIG. 9A, for example, the orientation of the article may be indicated using six directions 135*a* to 135*f* as shown in FIG. 10A.

Figure 11:
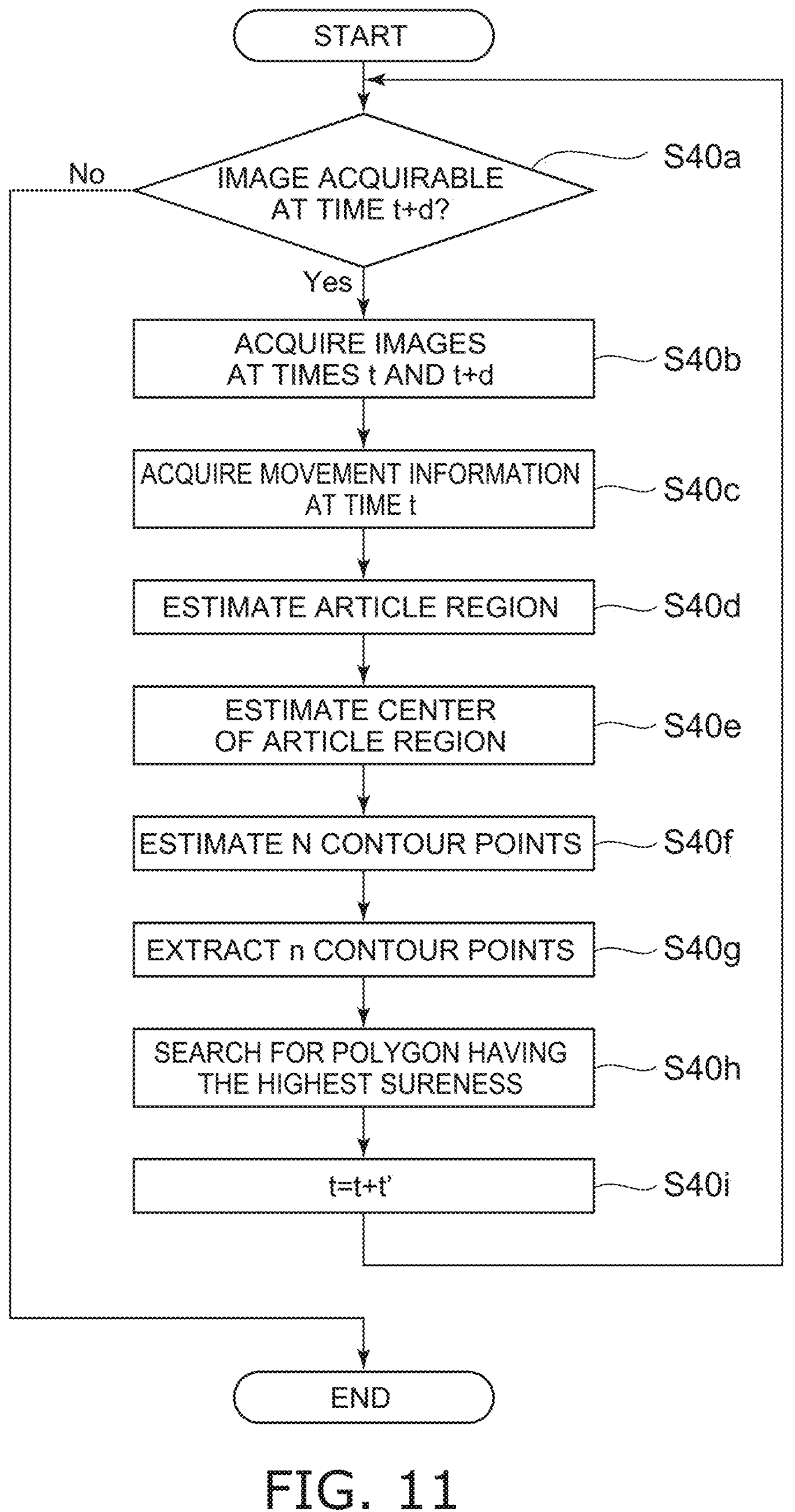
FIG. 11 is a flowchart showing an estimation method of the article position.

FIG. 11 is a flowchart showing an estimation method of the article position.

The processing device 20 estimates the article position at a time t according to the processing of the flowchart shown in FIG. 11. First, the processing device 20 determines whether or not an image can be acquired at a time t+d (step S40*a*). In other words, the processing device 20 determines whether or not an image was acquired by the imaging device 10 at the time t+d. When an image can be acquired at the time t+d, the processing device 20 acquires the image at the time t and the image at the time t+d (step S40*b*). The processing device 20 estimates movement information based on the image at the time t and the image at the time t+d (step S40*c*). The processing device 20 uses the movement information as the movement information at the time t. The processing device 20 estimates an article region based on the movement information (step S40*d*). At this time, the result of a pose estimation at the time t is used as a mask.

The processing device 20 estimates the center of the article region (step S40*e*). The processing device 20 uses the estimated center to estimate N contour points of the article (step S40*f*). The processing device 20 extracts n contour points based on the N contour points (step S40*g*). The processing device 20 uses the n contour points to search for a polygon having the highest sureness as the shape of the article (step S40*h*). The processing device 20 employs the coordinate of the center of the polygon obtained by the search as the article position. A value of t' added to the current time t is set as the time t (step S40*i*). Subsequently, step S40*a* is re-performed. Thereby, the estimation result of the article position at the time t is repeatedly updated each time the image at the time t+d can be obtained. When the image at the time t+d is determined to be unobtainable in step S40*a*, the processing device 20 ends the estimation processing of the article position.

Tracking Processing

The processing device 20 may perform tracking processing in addition to the estimation of the position using the movement information described above. In the tracking processing, a previous estimation result of the position is used to track the position in a newly-acquired image.

Specifically, the processing device 20 uses the estimation result of the position in a previous image and cuts out a part of the image in which the article is visible. The processing device 20 stores the cut-out image as a template image. When a new image is acquired, the processing device 20 performs template matching to search for the region in a new image that has the highest similarity. The processing device 20 employs the region obtained by the search as the estimation result of the position in the new image.

Figure 12:
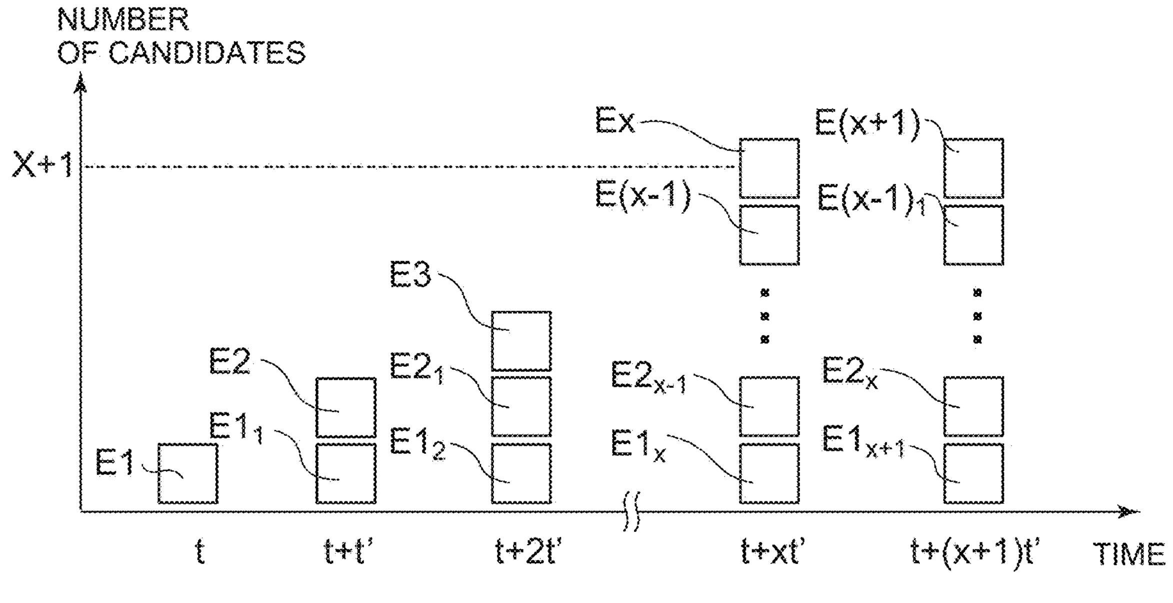
FIG. 12 is a schematic view illustrating the estimation result of the position when tracking processing is performed.

FIG. 12 is a schematic view illustrating the estimation result of the position when tracking processing is performed.

In FIG. 12, the horizontal axis is time. The vertical axis is the number of candidates of the estimated position. For example, an article position E1 is estimated at the time t using the movement information between the image at the time t and the image at the time t+d. The number of candidates of the article position at the time t is "1". Similarly, an article position E2 is estimated at the next a time t+t' by using the movement information between the image at the time t+t' and the image at a time t+t'+d. The processing device 20 estimates an article position $E1_1$ in the image at the time t+t'+d by using a template image based on the article position E1. Thereby, the number of candidates of the estimated article position at the time t+t' is "2".

Thereafter, similar processing is repeated each time a new image is acquired. For example, at the time t+xt', an article position $E1_x$ is estimated by repeating the tracking processing based on the article position E1. An article position $E2_{x-1}$ is estimated by repeating the tracking processing based on the article position E2. The processing device 20 employs the article position having the highest sureness at each time as the final article position.

For example, the similarities between a master image prepared beforehand and the images based on the article positions are used as the sureness used to narrow down the final article position. The images may be input to a model for state classification; and the certainties of the classification results may be used as the surenesses.

Or, the sureness may be calculated using a decision model. The decision model includes a deep learning model. The processing device 20 cuts out an image based on the estimation result of the article position and inputs the image to the decision model. The decision model determines whether or not the input image is cut out along the outer edge (the four sides) of the article. The decision model outputs a scalar value of 0 to 1 according to the input of the image. The output approaches 1 as the outer edge of the input image approaches the outer edge of the article. For example, the output is low when a part of the floor surface other than the article is cut out or only a part of the article is cut out. The processing device 20 cuts out an image for each estimated article position and obtains the outputs for the images. The processing device 20 acquires the outputs as the surenesses for the article positions.

The direction of the imaging by the imaging device 10 may be considered when calculating the sureness. For example, when the imaging device 10 images the worker and the article from a direction tilted with respect to the vertical direction, positions proximate to the imaging device 10 and positions distant to the imaging device 10 appear differently in the image. For example, a side that is proximate to the imaging device 10 appears longer, and a side that is distant to the imaging device 10 appears shorter. Based on this geometrical condition, the length of a reference side for the tilt is prestored in the memory device 30. The processing device 20 reads the length of the reference side stored in the memory device 30 for an angle θq of each article position candidate when tracking, and uses the difference with a length lq of the side of the article position when tracking as the sureness.

FIGS. 13 to 15D illustrate processing according to the processing system according to the embodiment.

Figure 13:
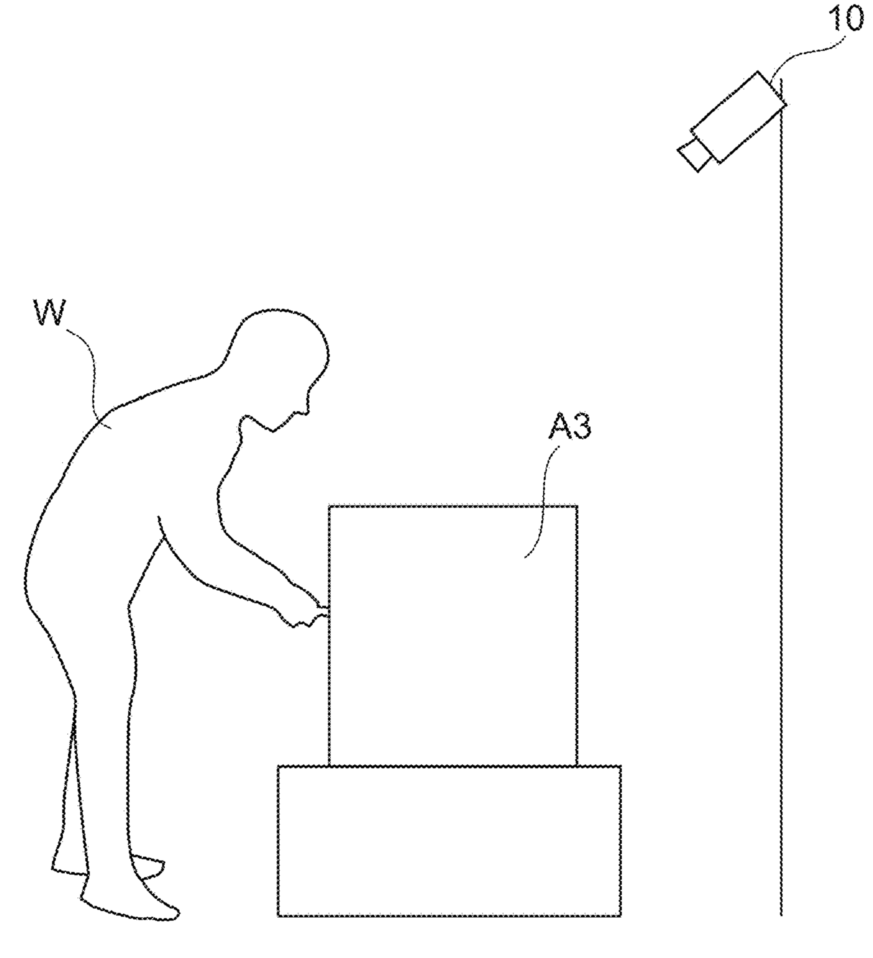
FIG. 13 illustrates processing according to the processing system according to the embodiment.

For example, as shown in FIG. 13, the worker W performs a task on an article A3. The imaging device 10 images the worker W and the article A3 obliquely from above. The article A3 is rectangular when viewed along the vertical direction.

Figures 14A, 14B, 14C:
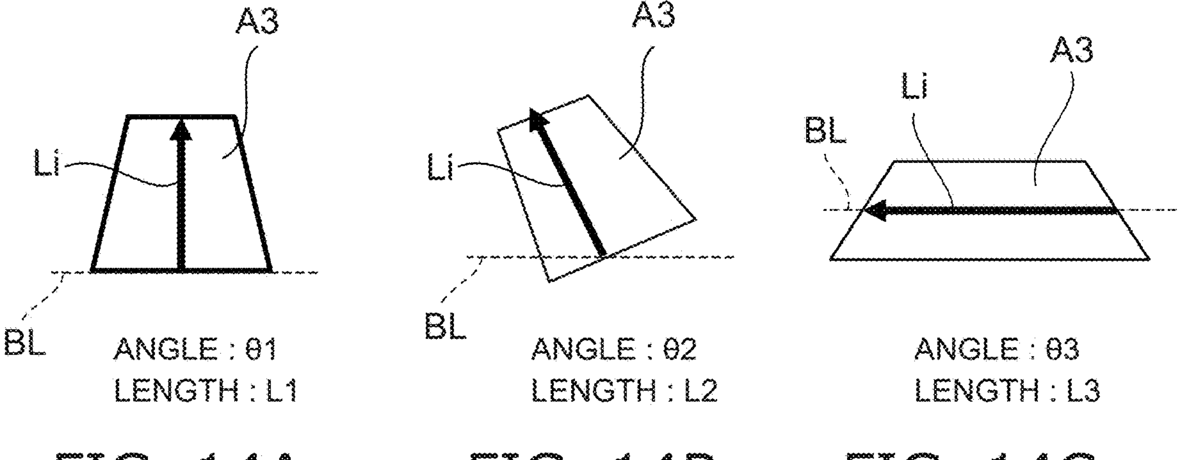
FIGS. 14A to 14D illustrate processing according to the processing system according to the embodiment.

In such a case, as shown in FIGS. 14A to 14C, the appearance of the article A3 is different according to the relative orientation of the article A3 with respect to the imaging device 10. The processing device 20 utilizes the appearance difference to calculate the sureness of the article position.

Specifically, the processing device 20 uses a preset rule to generate a line segment corresponding to the estimated article position. In the example of FIGS. 14A to 14C, first, the processing device 20 determines the short sides of the article based on the estimated article position. The processing device 20 generates a line segment Li connecting the short sides to each other. The processing device 20 calculates the length of the line segment Li. Also, the processing device 20 calculates the angle between a reference line BL and the line segment Li. In the example, the reference line BL is parallel to the lateral direction of the image.

Figure 14D:
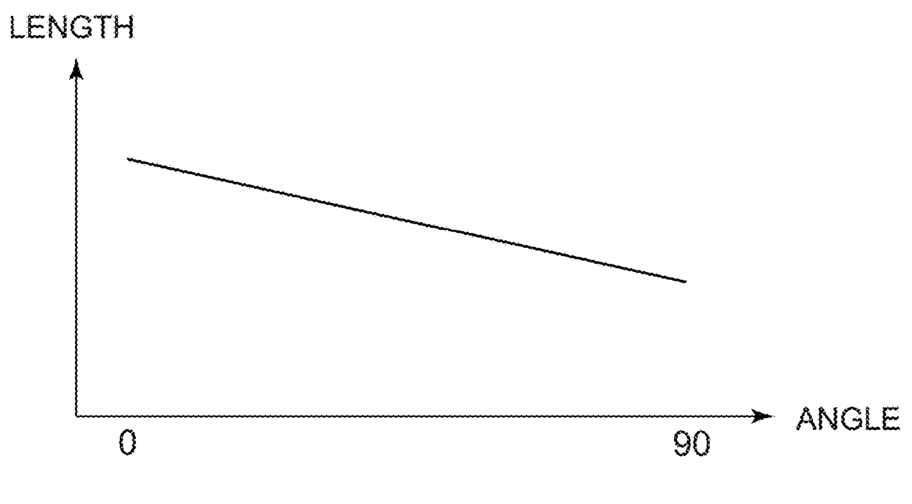

As a result of the calculation, angles θ1 to θ3 and lengths L1 to L3 are calculated respectively for the examples of FIGS. 14A to 14C. The angle θ1 is greater than the angle θ2; and the length L1 is less than the length L2. The angle θ2 is greater than the angle θ3; and the length L2 is less than the length L3. In other words, as shown in FIG. 14D, the length of the line segment Li decreases as the angle increases. Such a correspondence between the angle and the length is prestored in the memory device 30.

Figures 15A, 15B, 15C:
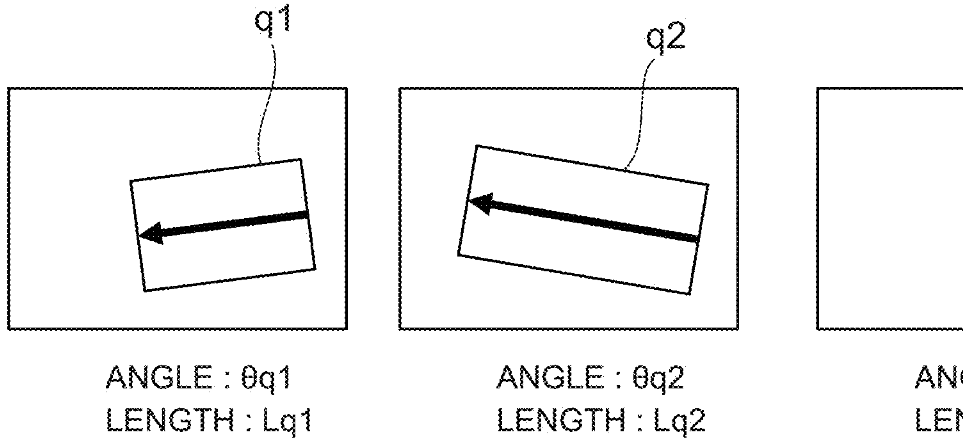
FIGS. 15A to 15D illustrate processing according to the processing system according to the embodiment.

FIGS. 15A to 15C show rectangles q1 to q3 obtained by the searches. The processing device 20 calculates the length and the angle of the line segment connecting the short sides to each other for each of the rectangles q1 to q3. As a result of the calculation, angles θq1 to θq3 and lengths Lq1 to Lq3 are calculated respectively for the examples of FIGS. 15A to 15C.

The processing device 20 refers to the correspondence and acquires the length corresponding to the calculated angle. The processing device 20 calculates the difference between the calculated length and the length corresponding to the angle, and calculates the sureness corresponding to the difference. The calculated sureness decreases as the difference increases.

Figure 15D:
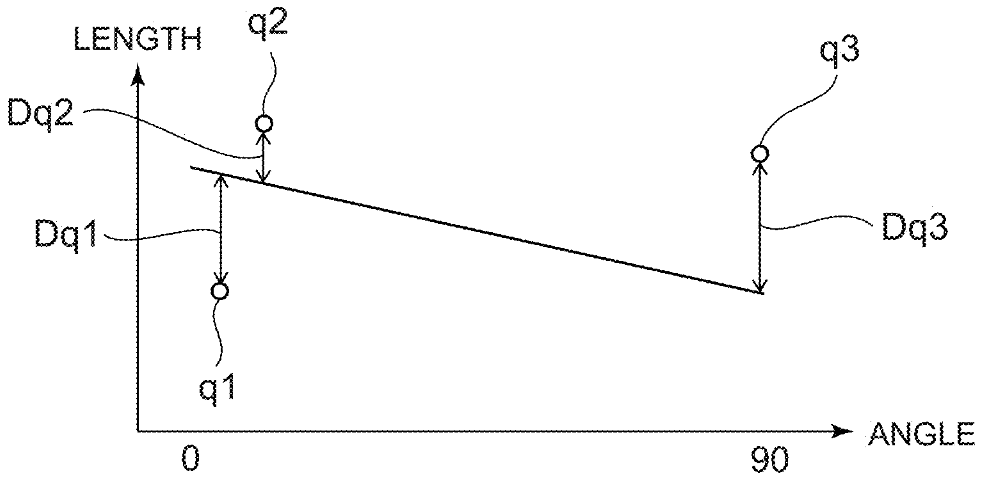

For example, for the rectangle q1 as shown in FIG. 15D, the processing device 20 calculates a difference Dq1 between the length Lq1 and the length corresponding to the angle θq1. Similarly, the processing device 20 calculates a difference Dq2 and a difference Dq3 for the rectangles q2 and q3. The processing device 20 uses the differences Dq1 to Dq3 to calculate the surenesses of the rectangles q1 to q3. In the example, the difference Dq1 is less than the difference Dq3 and greater than the difference Dq2. Therefore, the sureness of the rectangle q2 is greater than the sureness of the rectangle q3 and less than the sureness of the rectangle q1.

The article position can be estimated with higher accuracy as the number of candidates of the article position increases. On the other hand, if the number of candidates is too high, there is a possibility that the calculation amount necessary for the tracking processing may become excessive, and the processing may be delayed. It is therefore favorable for the number of candidates that are retained to be pre-specified. In the example shown in FIG. 12, "x+1" is set as the specified number. x+1 article positions are estimated at the time t+xt'. x+2 article positions are estimated at a time t+(x+1)t'. The processing device 20 narrows the x+2 article positions down to x+1 article positions. In the illustrated example, the result of the tracking processing based on the article position Ex is excluded, and the other article positions are extracted. The sureness described above can be used to narrow down the article position. The processing device 20 extracts the x+1 article positions in decreasing order of the sureness.

Figure 16:
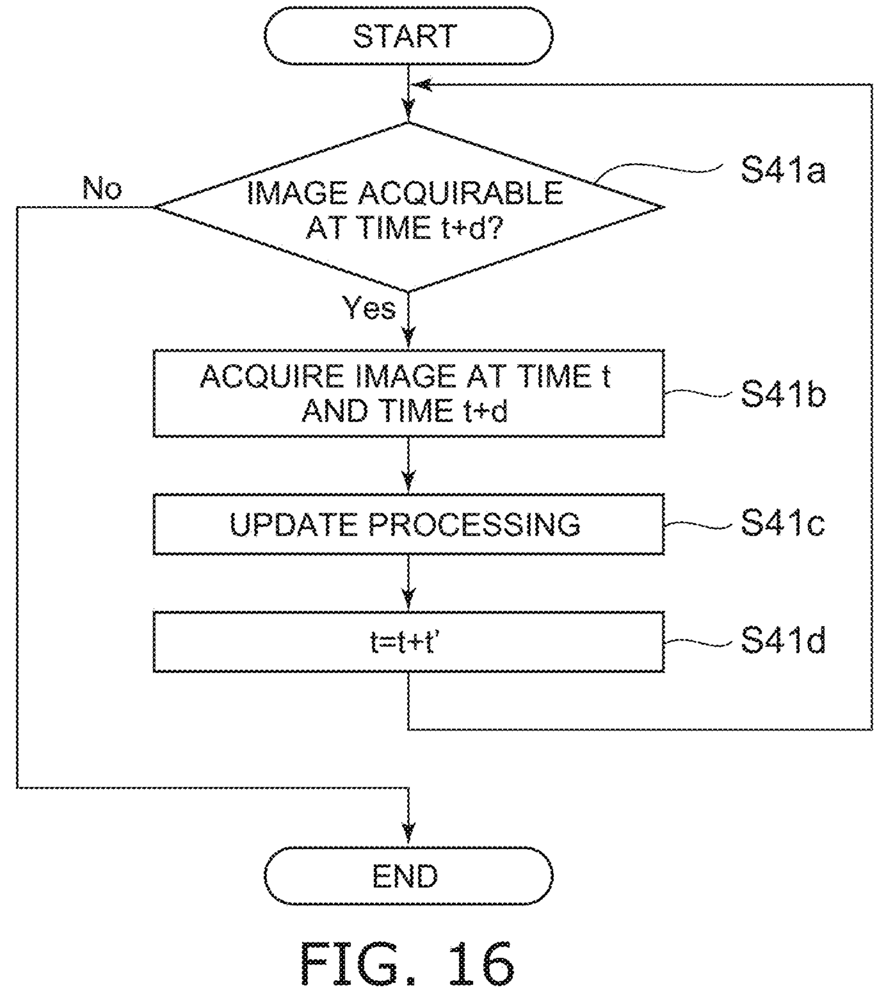
FIG. 16 is a flowchart showing an overview of the tracking processing.

FIG. 16 is a flowchart showing an overview of the tracking processing.

The processing device 20 determines whether or not an image can be acquired at the time t+d (step S41*a*). When an image can be acquired at the time t+d, the processing device 20 acquires an image at the time t and an image at the time t+d (step S41*b*). The processing device 20 uses the image at the time t+d to perform position update processing (step S41*c*). The value of t' added to the current time t is set as the time t (step S41*d*). Subsequently, step S41*a* is re-performed. When an image is determined to be unobtainable at the time t+d in step S41*a*, the processing device 20 ends the tracking processing.

Figure 17:
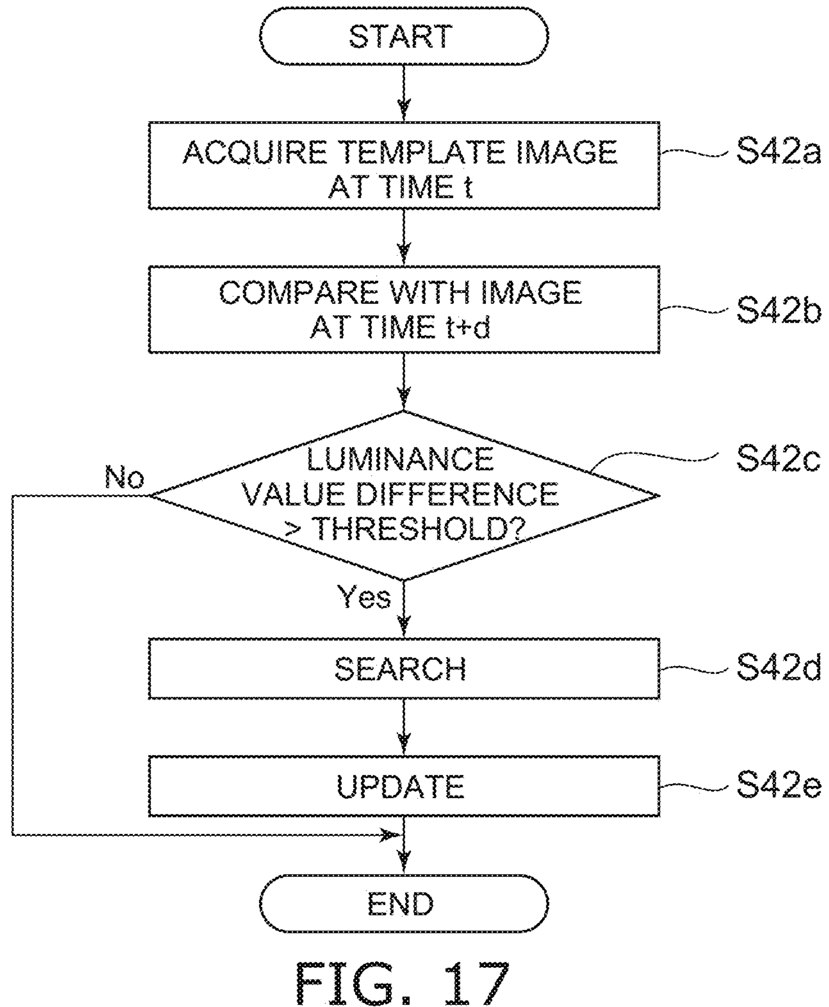
FIG. 17 is a flowchart showing the update processing of the tracking processing.

FIG. 17 is a flowchart showing the update processing of the tracking processing.

In the position update processing, the processing device 20 cuts out a part corresponding to the directly previously-estimated position from the image at the time t. The processing device 20 acquires the cut-out image as the template image at the time t (step S42*a*). The processing device 20 compares the image at the time t+d and the template image at the time tin the tracking candidate region (step S42*b*). The tracking candidate region is a part of the cut-out image and is set according to a preset parameter. For example, a region that is 50% of the image wide and 50% of the image long is cut out using the article position at the time t as the center, and is set as the tracking candidate region. The processing device 20 determines whether or not the luminance value difference between the two images is greater than a threshold (step S42*c*). When the difference is greater than the threshold, the processing device 20 searches for the position and orientation having the highest similarity inside the image at the time t+d while changing the position and orientation of the template image (step S42*d*). The processing device 20 updates the directly previously-estimated article position to the article position obtained by the search (step S42*e*). The update processing is skipped when the luminance value difference is not more than the threshold in step S42*c*. When skipping, the estimation result at a time t-d is inherited. Drift of the template matching is suppressed thereby.

FIGS. 18A to 18C and FIGS. 19A to 19C are images illustrating processing according to the processing system according to the embodiment.

Figure 18A:
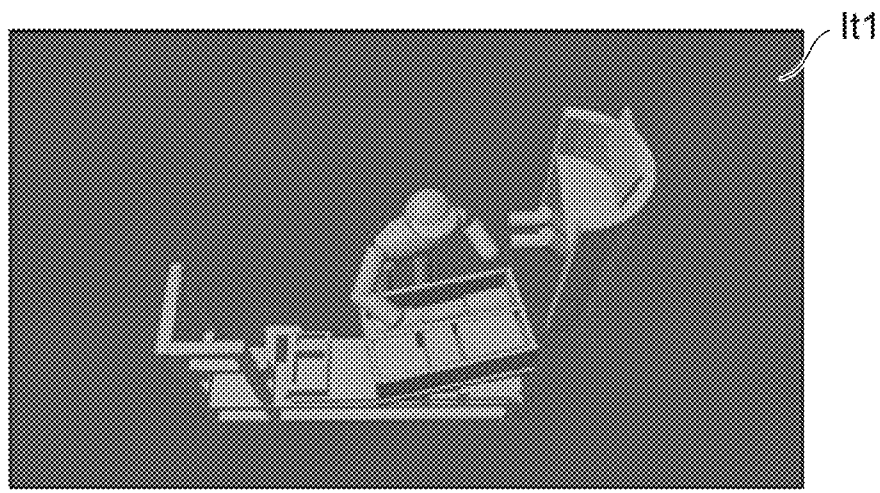
FIGS. 18A to 18C are images illustrating processing according to the processing system according to the embodiment.
Figure 18B:
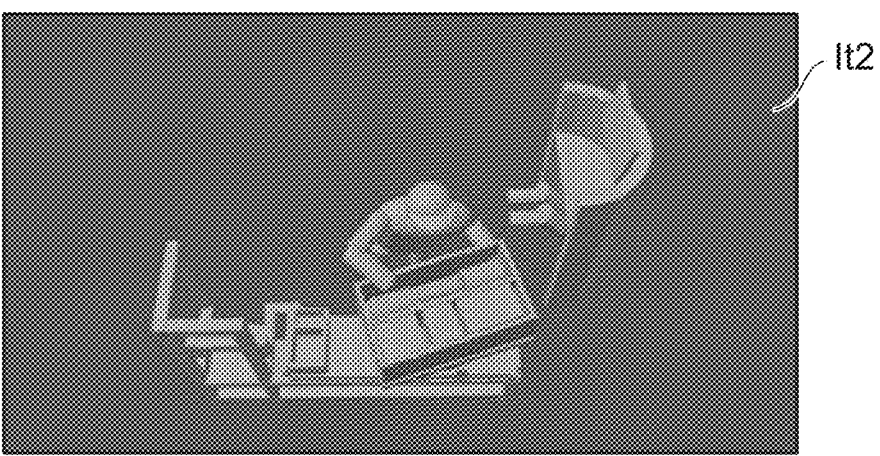
Figure 18C:
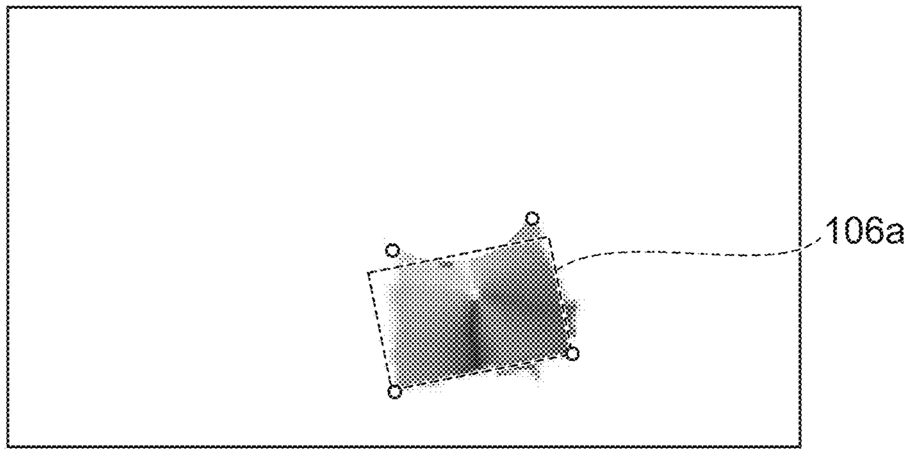

FIG. 18A shows the image It1 imaged at the time t1. FIG. 18B shows the image It2 imaged at the time t2. FIG. 18C shows the article position estimated based on the images It1 and It2. A rectangle 106*a* is employed in the position estimation.

Figure 19A:
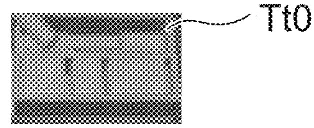
FIGS. 19A to 19C are images illustrating processing according to the processing system according to the embodiment.
Figure 19B:
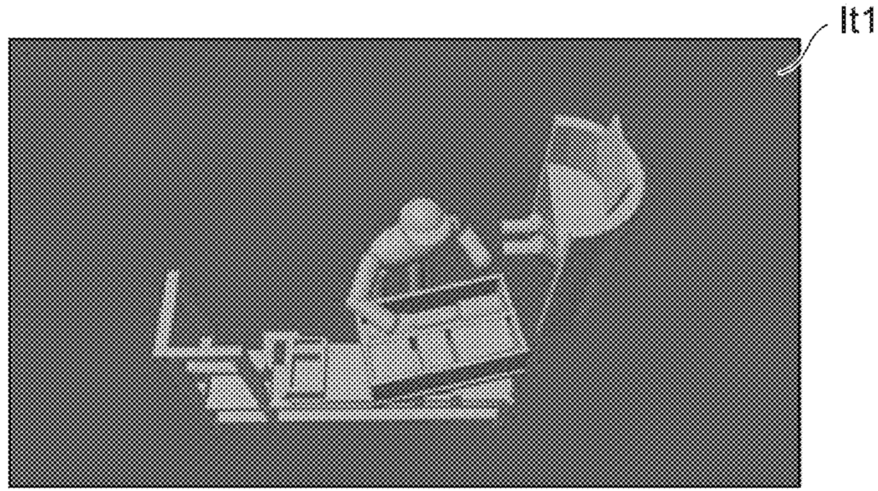
Figure 19C:
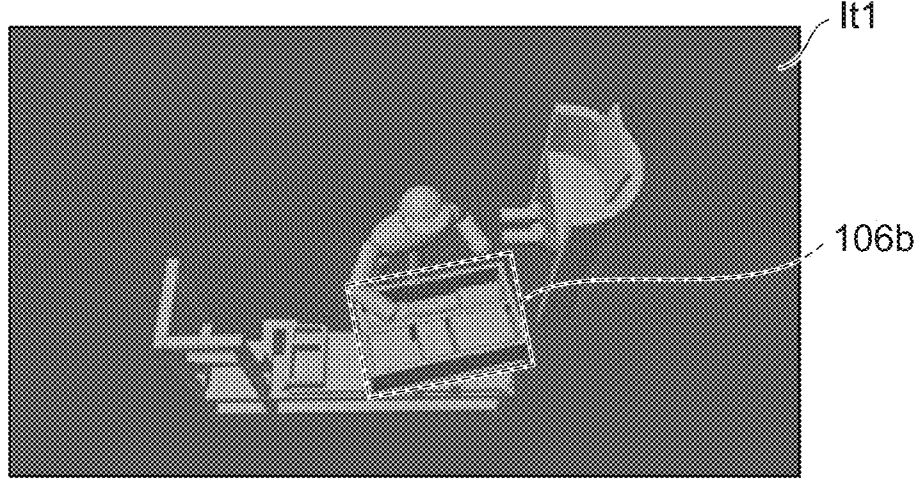

FIG. 19A shows a template image Tt0 at a time t0. The time t0 is before the time t1. The estimation result of the article position at the time t0 is used to cut out the template image from the image at the time t0. FIG. 19B shows the image It1 imaged at the time t1. FIG. 19C shows a rectangle 106*b* obtained by tracking processing using the template image Tt0. The article position in the image It1 is illustrated by the rectangle 106*b*. For example, the final article position is narrowed down from x article positions that include the article position shown in FIG. 18C and the article position shown in FIG. 19C.

State Estimation

The processing device 20 uses the image to estimate the state of the article in the image. For example, the estimation of the state includes template matching. The processing device 20 compares the image with multiple template images prepared beforehand. The state of the article is associated with each template image. The processing device 20 extracts the template image for which the maximum similarity is obtained. The processing device 20 estimates the state associated with the extracted template image to be the state of the article in the image.

Or, the processing device 20 may input the image to a state estimation model. The state estimation model is pre-trained to estimate the state of the article in the image according to the input of the image. For example, the state estimation model includes a neural network. It is favorable for the state estimation model to include a CNN. The processing device 20 acquires the estimation result of the state estimation model.

It is favorable for the processing device 20 to cut out a part from the entire image in which workers, etc., other than the article are imaged. The article is visible in the cut-out part of the image. The estimation result of the position of the article may be used in the cutout. The cutout increases the ratio of the surface area of the article visible in the image. The effects of elements other than the article on the estimation of the state can be reduced thereby. As a result, the accuracy of the estimation of the state can be increased. When the image is not cut out, it is also possible to directly estimate the state of the article from the image acquired by the imaging device 10.

Work Spot Estimation

The processing device 20 estimates the work spot of the worker on the article based on the estimation result of the pose of the worker, the estimation result of the position of the article, and the estimation result of the orientation of the article. For example, the processing device 20 acquires the position of the left hand and the position of the right hand of the worker based on the estimation result of the pose. The processing device 20 calculates the relative positions and the orientations of the left and right hands with respect to the article. The processing device 20 estimates the work spots on the article based on the relative positional relationship.

Figure 20:
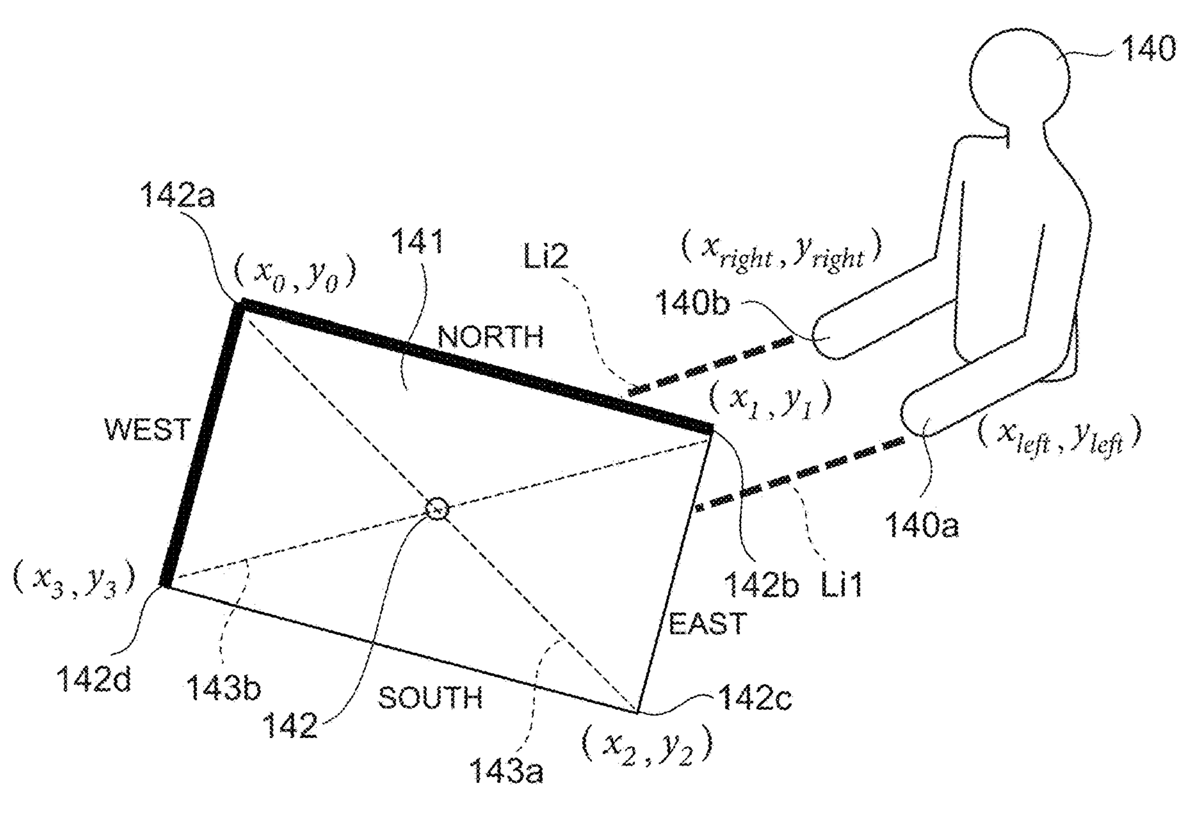
FIG. 20 is a schematic view illustrating an estimation method of the work spot.

FIG. 20 is a schematic view illustrating an estimation method of the work spot.

In the example of FIG. 20, the position ($x_{left}$, $y_{left}$) of a left hand 140*a* and the position ($x_{right}$, $y_{right}$) of a right hand 140*b* of a worker 140 are estimated. A center 142 and the positions ($x_0$, $y_0$), ($x_1$, $y_1$), ($x_2$, $y_2$), and ($x_3$, $y_3$) of four corners 142*a* to 142*d* are estimated as the position of an article 141. Also, the orientation of the article, i.e., "north", "east", "south", and "west" are estimated. The orientation of the article is subdivided by boundary lines 143*a* and 143*b* passing through the center 142. In the example, the diagonal lines of the rectangular article 141 are set as the boundary lines 143*a* and 143*b*. The directions and number of the boundary lines are appropriately set according to the shape of the article.

The processing device 20 sets gates for estimating the work spots based on the position and orientation of the article. For example, the processing device 20 sets the gates of "north", "east", "south", and "west" along the sides of the article 141. As shown by a line Li1, the left hand 140*a* faces the gate of "east". As shown by a line Li2, the right hand 140*b* faces the gate of "north". The line Li1 and the line Li2 are respectively the extension line of the left lower arm and the extension line of the right lower arm. The lower arm is the line segment (the bone) connecting the wrist and the elbow.

Based on the positions of the joints and the gates, the processing device 20 estimates that the left hand 140*a* is positioned at the east side of the article 141. In other words, the work spot of the left hand is estimated to be the east side of the article. Also, the processing device 20 estimates that the right hand 140*b* is positioned at the north side of the article 141. In other words, the work spot of the right hand is estimated to be the north side of the article.

The joints that are used to estimate the work spots are arbitrary. For example, the position of the finger, the wrist, or the elbow may be used to estimate the work spot according to the task being performed. The positions of multiple such joints may be used to estimate the work spot.

Figure 21:
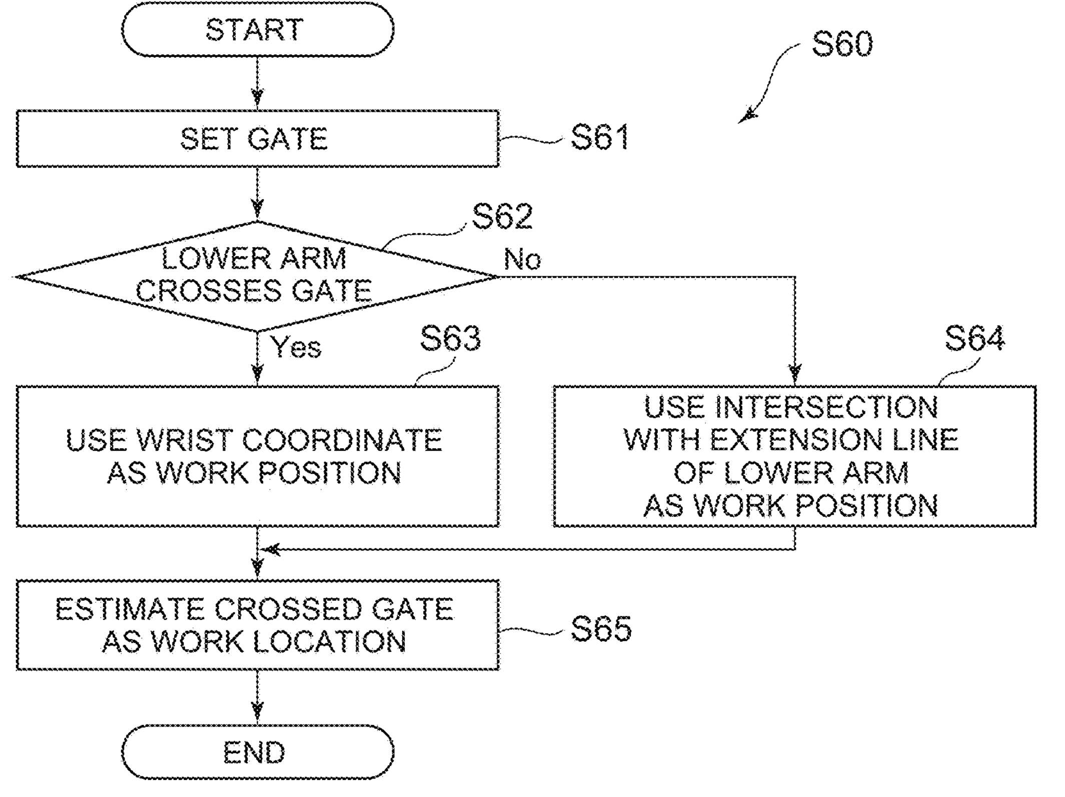
FIG. 21 is a flowchart showing the estimation method of the work spot.

FIG. 21 is a flowchart showing the estimation method of the work spot.

The processing device 20 sets the gates in each direction of the article based on the position and orientation of the estimated article (step S61). The processing device 20 determines whether or not the lower arms of the worker cross the gates (step S62). When a lower arm crosses a gate, the processing device 20 sets the position of the left hand and the position of the right hand as the work positions (step S63). When the lower arms do not cross the gates, the processing device 20 sets the intersections between the gates and the extension lines of the lower arms as the work positions (step S64). The processing device 20 estimates the gates crossed by the lower arm or the extension line to be the work spots (step S65).

Task Estimation

The processing device 20 estimates the task performed by the worker based on the state of the article and the estimation result of the work spot. For example, the memory device 30 stores a task database that includes data related to the task. The task database includes a list of the tasks that may be performed. The state of the article and the work spots are pre-associated with each task. The processing device 20 refers to the task database and extracts the task among the multiple tasks that corresponds to the estimated work spot and state of the article. The processing device 20 estimates that the extracted task is being performed by the worker.

The task database may store the execution sequence of the tasks. In such a case, the processing device 20 estimates the task being performed based on the tasks estimated up to that point and the task corresponding to the estimated work spot and state of the article. By referring to the execution sequence, the estimation accuracy of the task can be increased.

FIG. 22 is an example of the task database.

A task database 150 shown in FIG. 22 includes a number 151, a major item 152, a medium item 153, task content 154, an article state 155, and a work spot 156. The number 151 is the numeral assigned to each task. For example, the number 151 shows the sequence of the task being performed. A numeral for identifying each task may be registered as the number 151. The major item 152 shows the general classification of the task. The medium item 153 shows a medium-level classification related to the tasks included in the major item 152. The task content 154 shows specific task included in the medium item 153. The article state 155 shows the state of the article when the task content 154 is performed. The work spot 156 shows the work spot when the task content 154 is performed.

While the task is being performed, images of the state of the task are repeatedly acquired. The processing device 20 repeats an estimation of the task based on the images. The task that is being performed by the worker at each time is estimated thereby.

Figure 23:
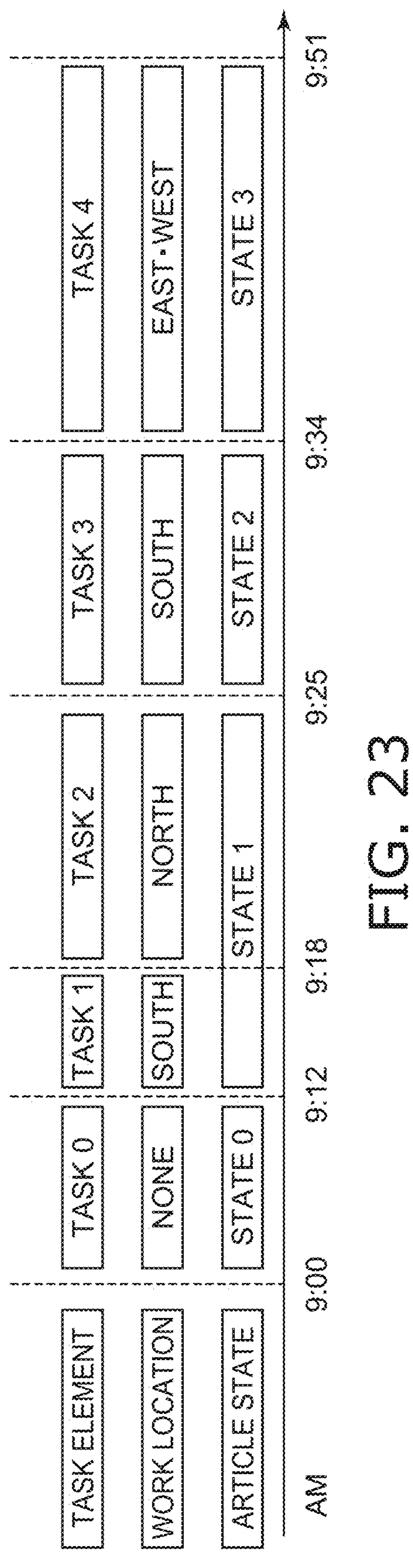
FIG. 23 is a schematic view illustrating an output result according to the processing system according to the embodiment.

FIG. 23 is a schematic view illustrating an output result according to the processing system according to the embodiment.

In FIG. 23, the lateral direction is time. The vertical direction is the estimation result of the article state and the work spot based on the images at each time. The uppermost row shows the tasks estimated based on the article state and the work spot.

To increase the accuracy of the estimation, the processing device 20 may estimate the task being performed based on the estimation result of a task estimation in a prescribed period.

Figure 24:
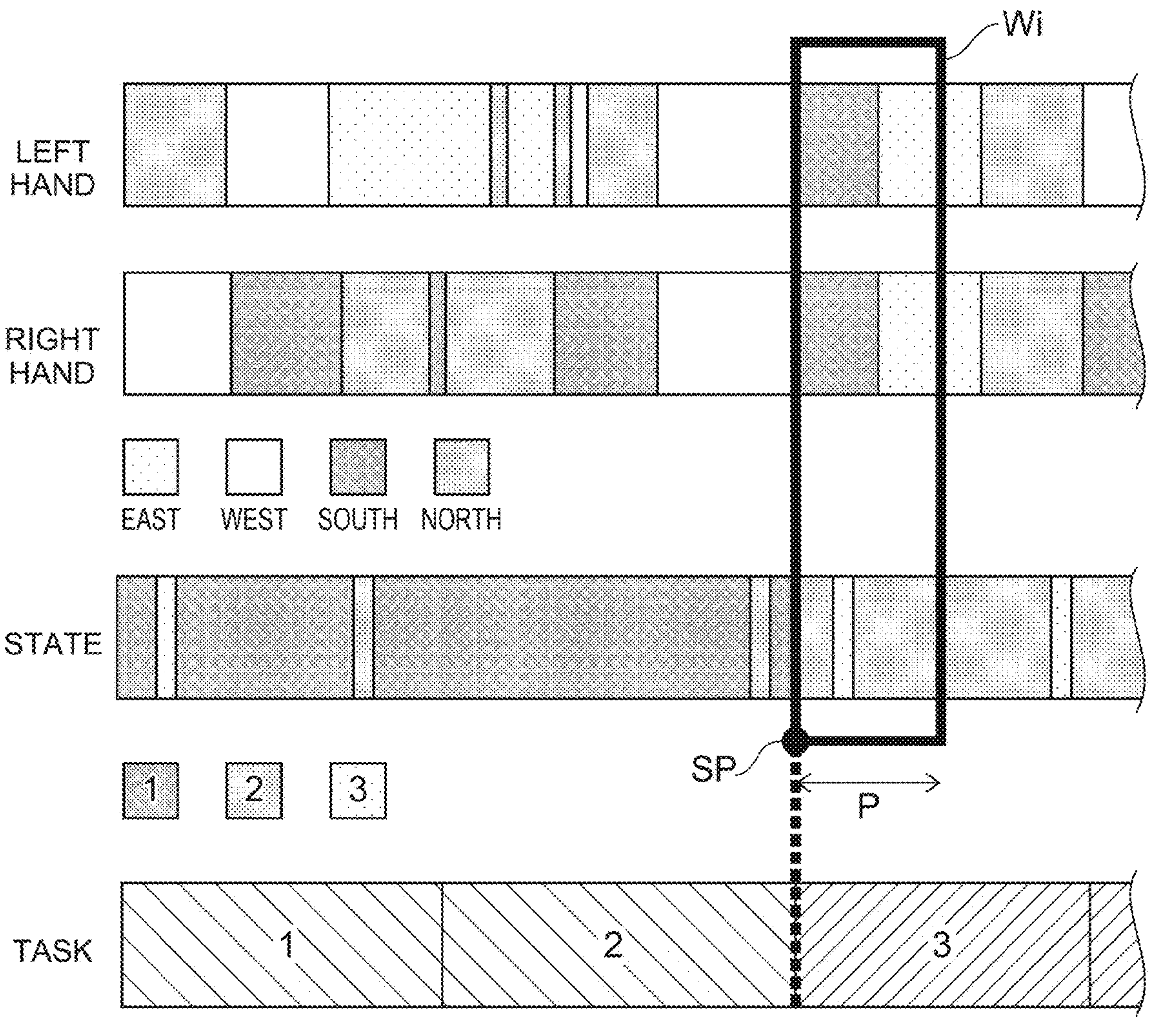
FIG. 24 is a schematic view illustrating processing according to the processing system according to the embodiment.

FIG. 24 is a schematic view illustrating processing according to the processing system according to the embodiment.

FIG. 24 shows the estimation result of the task based on the work spot of the left hand, the work spot of the right hand, and the estimation result of the state of the article. One of "east", "west", "south", or "north" of the article is estimated as the work spot. As shown in FIG. 24, the processing device 20 sets a window Wi when estimating the task. A duration (period) P of the window Wi is set based on the standard time of the task following the task that is already estimated. For example, after the start of a "task 2" is estimated, the period P of the window Wi is set based on the standard time of the next "task 3".

The processing device 20 summarizes the execution times of the tasks estimated inside the window Wi. When the ratio of the period of a task in the period of the window Wi is greater than a preset threshold, the processing device 20 estimates that the task is being performed. As an example, the threshold is set to 0.5.

The processing device 20 estimates the task while continuously sliding the window Wi. The slide amount of the window Wi is set to be sufficiently small with respect to the period of the window Wi.

When it is estimated that a task is being performed, the processing device 20 estimates that the task was performed from the starting point of the window Wi. Accordingly, when the "task 3" is estimated to be performed in the illustrated window Wi, it is estimated that the "task 3" was performed from a starting point SP of the window Wi.

As shown in FIG. 24, the work spots may transition in one task. The processing device 20 may use the transition of the work spots to estimate the task.

In practice, as shown in FIG. 24, the state of the article may be erroneously estimated. In the illustrated example, the state is temporarily estimated to be the "state 2", the "state 3", or the "state 4" in the period that should be estimated to be the "state 1". Also, there are instants when the work spots are in transition. There is a possibility that the task may be erroneously estimated based on such a temporary erroneous estimation result.

For this problem, the task that is performed in the window Wi is estimated based on multiple estimation results of the work spot and multiple estimation results of the state in the window Wi as described above, and the effects of temporary erroneous estimation results on the estimation result of the task can be reduced. The estimation accuracy of the task can be increased.

Figure 25:
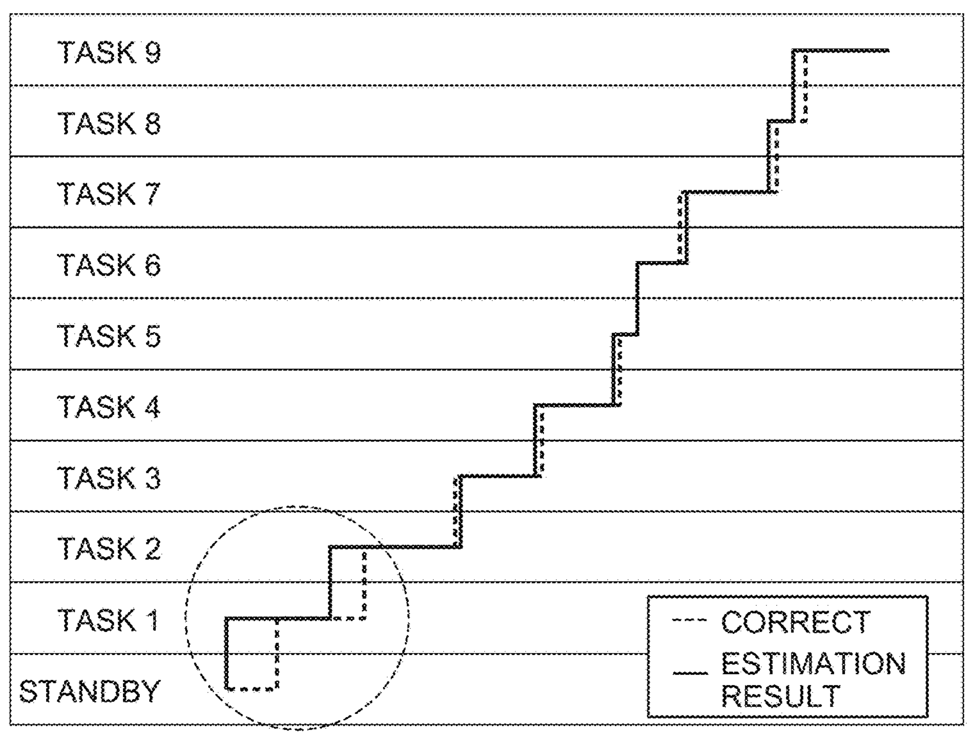
FIG. 25 is a graph illustrating estimation results according to the processing system according to the embodiment.
Figure 26:
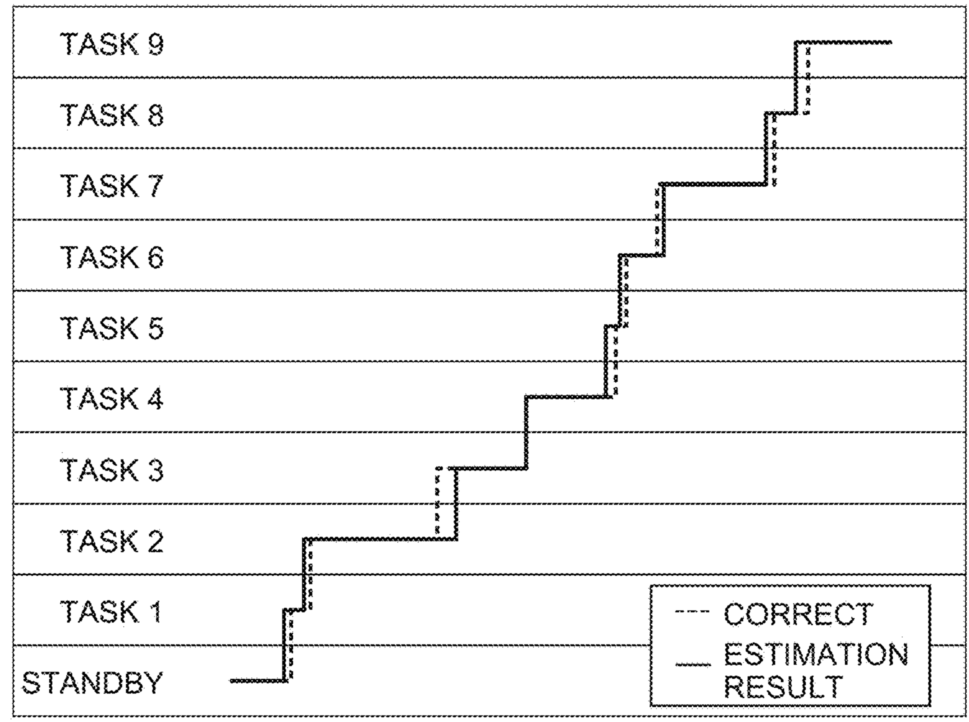
FIG. 26 is a graph illustrating estimation results according to the processing system according to the embodiment.

FIGS. 25 and 26 are graphs illustrating estimation results according to the processing system according to the embodiment.

In FIGS. 25 and 26, the lateral direction is time. The vertical direction is the task being performed. In FIGS. 25 and 26, the solid line shows the estimation result of the task by the processing device 20. The broken line shows the transition of the task actually being performed. FIG. 25 shows the result of estimating the task without using the window described above. FIG. 26 shows the result of estimating the task by using the window.

In the result shown in FIG. 25, good estimation results are obtained for the "task 3" to the "task 9". On the other hand, for the "task 1" and the "task 2", an erroneous estimation occurs at the part surrounded with the broken line.

In the result shown in FIG. 26, good estimation results are obtained for the "task 3" to the "task 9", and good estimation results are obtained for the "task 1" and the "task 2".

The processing device 20 may calculate data related to the task performed based on repeated estimations of the task. For example, the processing device 20 calculates the time (man-hours) from the start to the end of each task. The processing device 20 may calculate the progress amount with respect to the schedule by comparing the pre-generated schedule and the performed task. The processing device 20 may calculate the delay or earliness of the performed task with respect to the schedule. The processing device 20 may compare the preset standard man-hours and the actual man-hours for each task. The processing device 20 extracts the task when the actual man-hours are greater than the standard man-hours. A task that has room for improvement is automatically extracted thereby.

The estimation of the task described above is repeated until the end condition is satisfied. For example, the operation ends at a preset time. The end time of the operation is set to, for example, the shift end time, a preset elapsed time from the start of the task, etc. The operation may end when the last task is estimated to be completed. Whether or not the performed task is the last can be determined based on the task database. The instruction of the end may be input by the user or a higher-level system.

System Configuration

Figure 27:
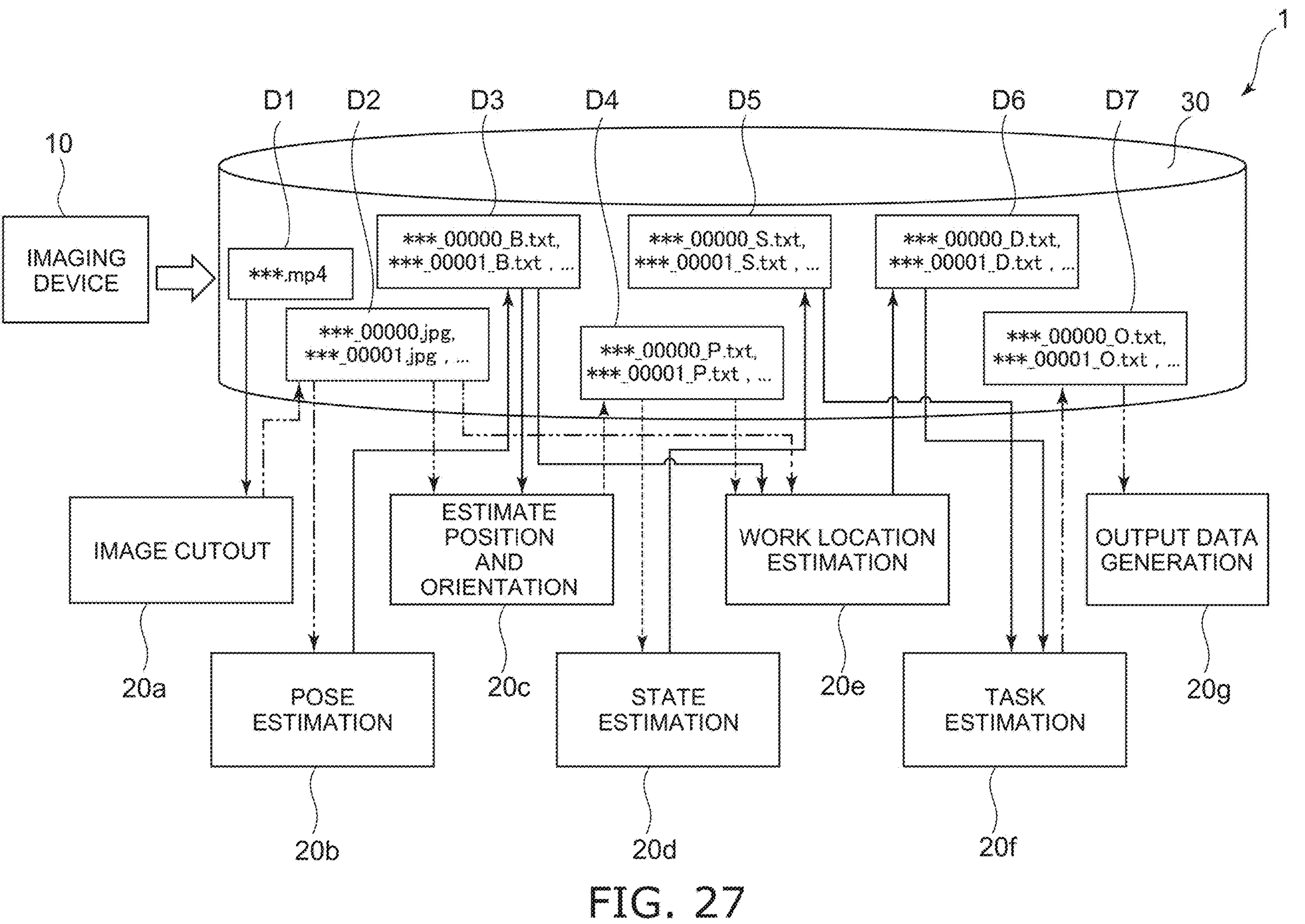
FIG. 27 is a schematic view illustrating the specific configuration of the processing system according to the embodiment.

FIG. 27 is a schematic view illustrating the specific configuration of the processing system according to the embodiment.

The processing related to the estimation described above may be executed by one processing device 20 (a computer) or may be executed by a collaboration of multiple processing devices 20. To estimate the task in real time, it is favorable for the calculation amount per one processing device 20 to be low. It is therefore favorable for the processing related to the estimation to be performed by the multiple processing devices 20.

For example, as shown in FIG. 27, the processing system 1 includes multiple processing devices 20*a* to 20*g*. Video image data D1 is stored in the memory device 30 when acquired by the imaging device 10. The processing device 20*a* monitors the memory device 30 and cuts out an image data D2 from the video image data D1 when the video image data D1 is stored. The processing device 20*a* stores the image data D2 in the memory device 30. The processing device 20*b* monitors the memory device 30 and estimates the pose of the worker based on the image when the image data D2 is stored. The processing device 20*b* stores pose data D3 of the estimation result of the pose in the memory device 30. The processing device 20*c* monitors the memory device 30 and estimates the position and orientation of the article when the image data D2 and the pose data D3 are stored. The processing device 20*c* stores article data D4 of the estimation result of the position and orientation of the article in the memory device 30. The processing device 20*d* monitors the memory device 30 and estimates the state of the article when the article data D4 is stored. The processing device 20*d* stores state data D5 of the estimation result of the state in the memory device 30. The processing device 20*e* monitors the memory device 30 and estimates the work spot when the image data D2, the pose data D3, and the article data D4 are stored. The processing device 20*e* stores work spot data D6 of the estimation result of the work spot in the memory device 30. The processing device 20*f* monitors the memory device 30 and estimates the task being performed when the image data D2, the pose data D3, the article data D4, the state data D5, and the work spot data D6 are stored. The processing device 20*f* stores task data D7 of the task being performed in the memory device 30. The processing device 20*g* generates data to be output to the output device 50 based on the task data D7. Also, the processing device 20*g* may calculate the man-hours, make a comparison with the schedule, etc.

The specific processing methods according to the processing system 1 according to the embodiment are not limited to the examples described above. The next processing may be performed in response to the generation of a file as described above. Or, a file may not be generated, and the next processing may be performed in response to data corresponding to each file being stored in memory. The data may be communicated between the processing devices; and the next processing may be performed in response to the transmission and reception of the data.

User Interface

Figure 28:
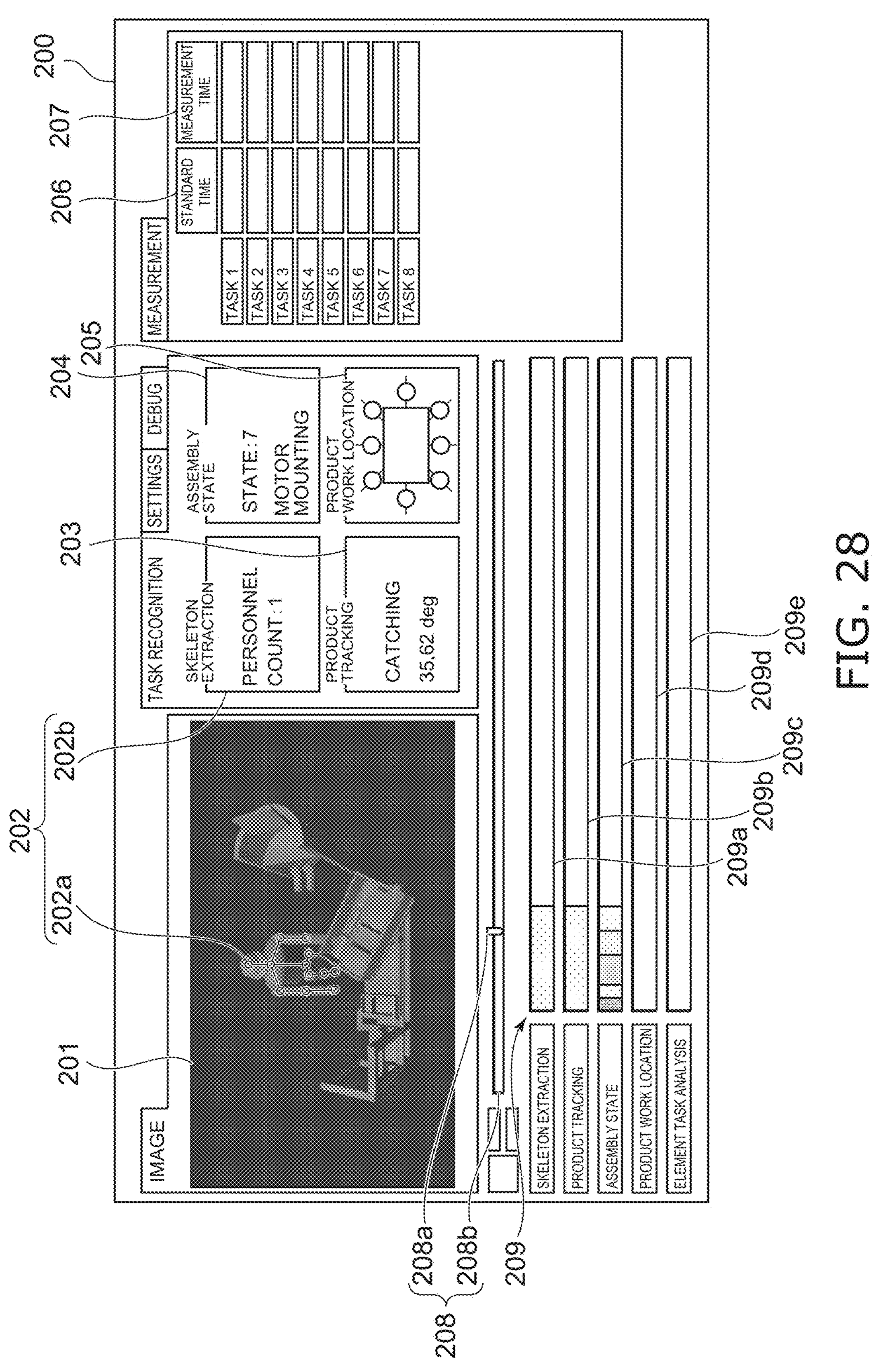
FIG. 28 is a schematic view showing output examples according to the processing system according to the embodiment.
Figure 29:
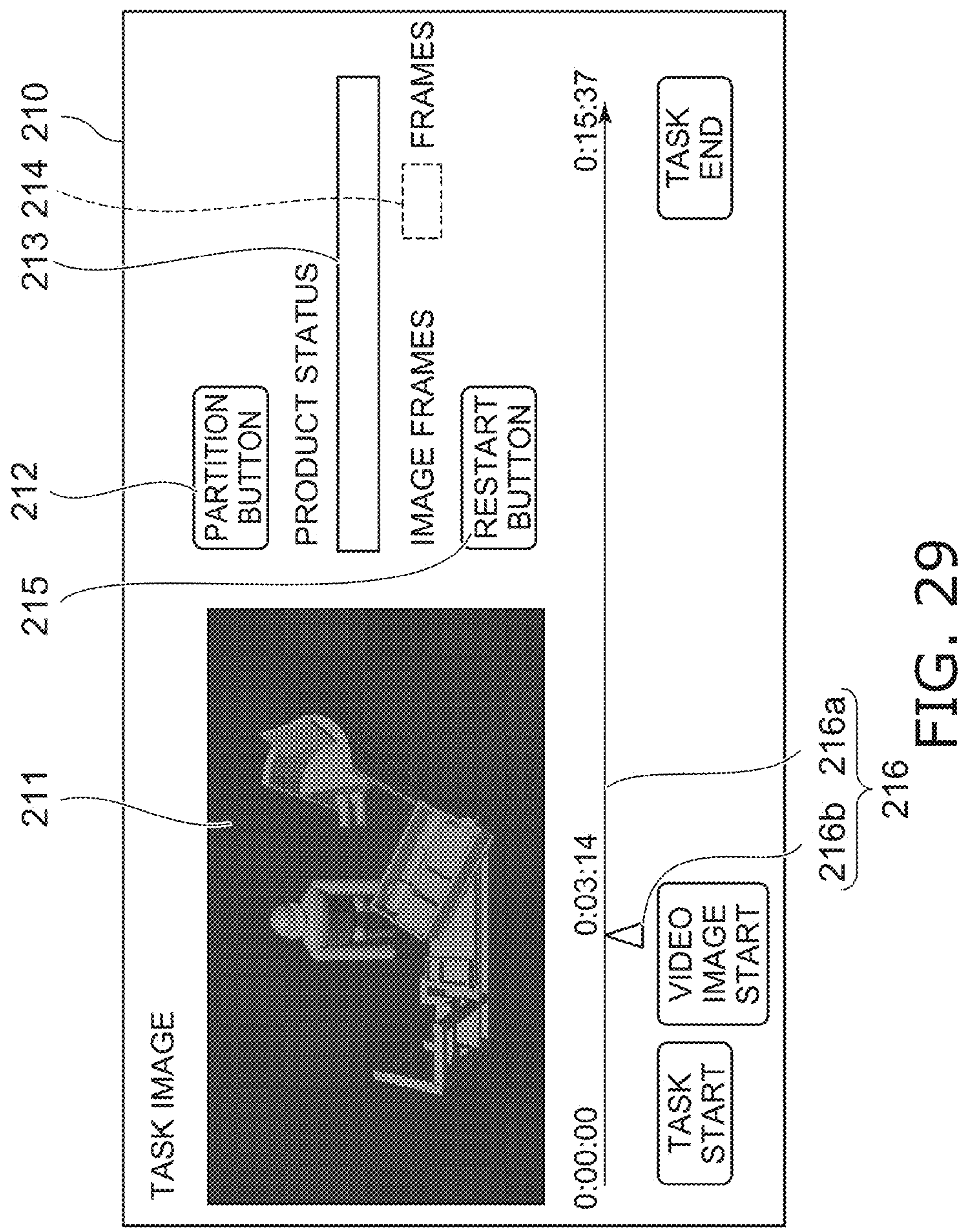
FIG. 29 is a schematic view showing output examples according to the processing system according to the embodiment.
Figure 30:
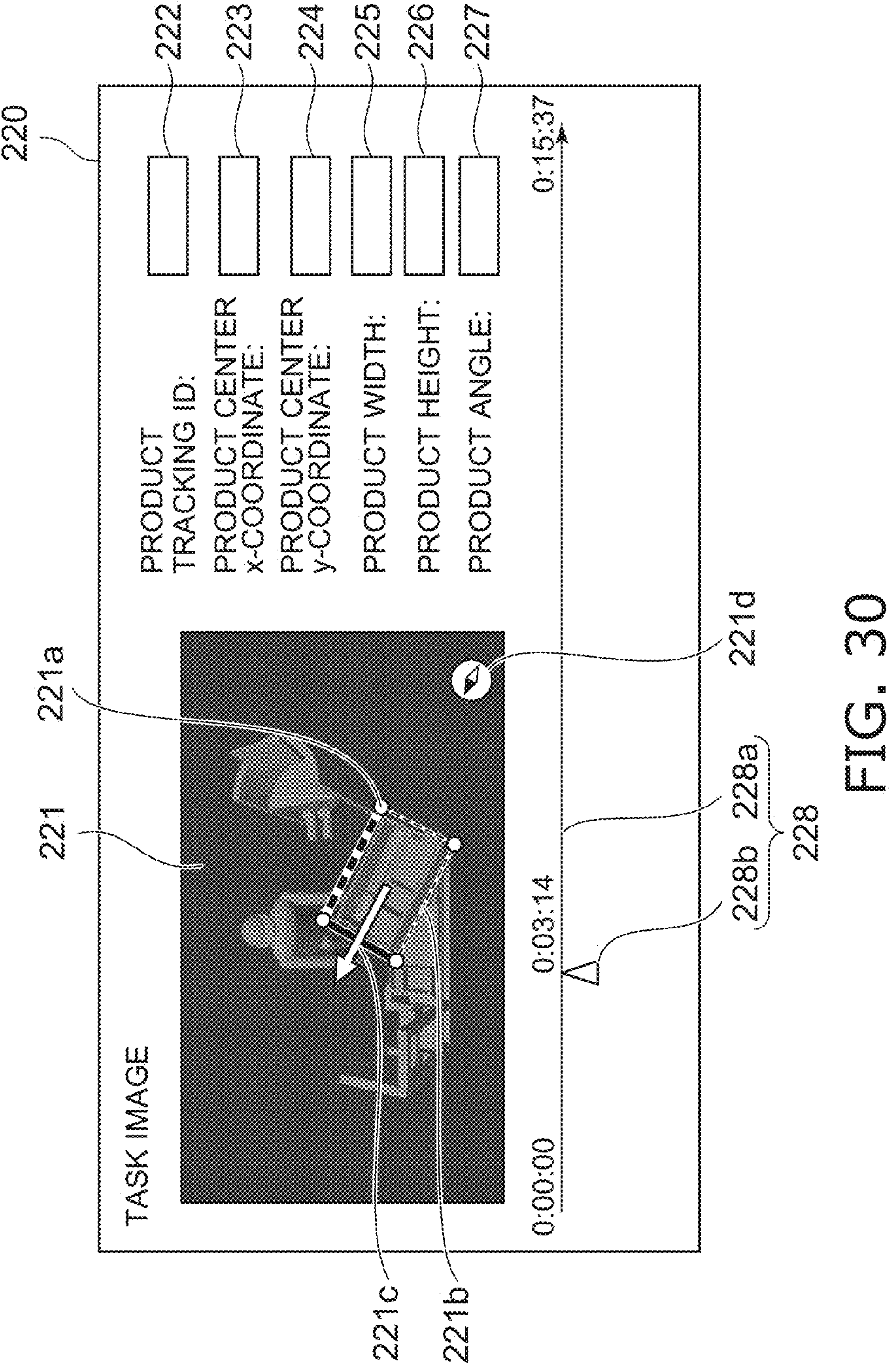
FIG. 30 is a schematic view showing output examples according to the processing system according to the embodiment.

FIGS. 28 to 30 are schematic views showing output examples according to the processing system according to the embodiment.

For example, the processing device 20 causes the output device 50 to display a user interface (UI) 200 shown in FIG. 28. The UI 200 displays an image 201, a pose estimation result 202, a tracking result 203, a state estimation result 204, a work spot estimation result 205, a standard time 206, a measurement time 207, a seek bar 208, and a time chart 209 related to the estimation result.

The image 201 shows an image cut out from a video image acquired by the imaging device 10. The pose estimation result 202 includes an estimated skeleton 202*a* and an estimated personnel count 202*b*. The skeleton 202*a* is the result of the pose estimation for the image 201. The tracking result 203 shows whether or not the article in the image 201 can be tracked, and the orientation of the article. In the example, the orientation is shown as an angle with respect to a preset reference line. The state estimation result 204 shows the estimation result of the state of the article based on the image 201. The work spot estimation result 205 shows the estimation result of the work spot based on the image 201. The standard time 206 shows the standard time (man-hours) of each task. The measurement time 207 shows the time (man-hours) measured based on the estimation result of the task for each task.

The seek bar 208 includes a slider 208*a* and a bar 208*b*. The slider 208*a* shows the timing at which the image 201 was imaged. The user can display the estimation result for the image at any time by sliding the slider 208*a* along the bar 208*b*. The time chart 209 includes charts 209*a* to 209*e*. The chart 209*a* shows the availability of the pose estimation at each time. Different forms (colors) are used to display the periods in which the pose estimation by the processing device 20 was successful and the periods in which the pose estimation by the processing device 20 was unsuccessful. The chart 209*b* shows whether or not the article can be tracked. Different colors are used to display the periods in which the tracking of the article by the processing device 20 was successful and the periods in which the tracking of the article by the processing device 20 was unsuccessful. The chart 209*c* shows the result of the state estimation. Colors that correspond to the states are displayed in the chart 209*c*. The chart 209*d* shows the estimation result of the work spot. Colors that correspond to the work spots are displayed in the chart 209*d*. The chart 209*e* shows the estimation result of the task. Colors that correspond to the tasks are displayed in the chart 209*e*.

The processing device 20 may display the UI 210 shown in FIG. 29 to prepare data necessary for training the state estimation. The UI 210 displays an image 211, a button 212, an input field 213, a field 214, a button 215, and a seek bar 216.

The image 211 shows an image cut out from a video image acquired by the imaging device 10. The button 212 is for setting the end of the cutout of the image. The input field 213 receives input of the state of the article in the cut-out image. The number of the cut-out images is displayed in the field 214. The button 215 is for setting the start of the cutout of the image. The seek bar 216 includes a slider 216*a* and a bar 216*b*. The slider 216*a* shows the timing at which the image 211 was imaged. The user can display the estimation result for the image at any time by sliding the slider 216*a* along the bar 216*b*.

The processing device 20 cuts out images at a prescribed interval from the period set by the buttons 212 and 215. The number of images to be cut out from the set period is displayed in the field 214. The processing device 20 associates the state set by the input field 213 with the cut-out image. The estimation of the position and orientation of the article may be performed for the image. The processing device 20 cuts out a part of the image based on the estimation result and associates the part of the image with the set state.

The user can use the UI 210 to easily prepare the image associated with the state of the article. The prepared image can be utilized to train a model for estimating the state of the article, as a template image of template matching, etc.

The processing device 20 may cause the output device 50 to display the UI 220 shown in FIG. 30. The UI 220 displays an image 221, fields 222 to 227, and a seek bar 228.

The seek bar 228 includes a slider 228*a* and a bar 228*b*. The slider 228*a* shows the timing at which the image 221 was imaged. The position (time) of the slider 228a is displayed proximate to the slider 228a. The user can display the image at any time by sliding the slider 228a along the bar 228b.

The image 221 displays marks 221a. The marks 221a correspond to vertices of a polygon. The user can use the input device 40 to move the marks 221a in the image 221 by drag & drop. When the movement of the marks 221a is received, the processing device 20 depicts a polygon corresponding to the moved marks 221a. Four marks 221a are displayed in the example shown in FIG. 30. A rectangle 221b that corresponds to the four marks 221a also is displayed, and "north" and "east" of the rectangle 221b are shown respectively by a thick solid line and a thick broken line. The user moves the marks 221a to display the rectangle 221b that corresponds to the shape of the article in the image 221.

The image 221 also displays an arrow 221c. The arrow 221c shows the orientation of the rectangle 221b. The user can move the starting point and end point of the arrow 221c by drag & drop. For example, the direction that is perpendicular to one side crossing the arrow 221c and is from the starting point to the end point of the arrow 221c is set to "north". The directions of "east", "south", and "west" are sequentially set clockwise from "north". In the illustrated example, among the four sides of the rectangle 221b, the two sides facing "north" and "east" are shown by thick lines. As shown in FIG. 30, a symbol 221d that shows the orientation of the rectangle 221b may be displayed. In the illustrated example, a compass is displayed as the symbol showing the orientation.

The processing device 20 calculates data related to the rectangle 221b that is set and displays the data in the fields 222 to 227. For example, in the fields 225 to 227, the "width" is the distance between the short sides of the rectangle 221b. The "height" is the distance between the long sides of the rectangle 221b. The "angle" is the angle of the "north" direction of the rectangle 221b with respect to the preset reference line.

The user can use the UI 220 to easily prepare the image associated with the position and orientation of the article. The prepared image can be utilized to train a decision model for obtaining the sureness.

Advantages of embodiments will now be described.

Various methods have been tried to estimate the task being performed. For example, technology in which the task can be estimated in more detail or more accurately is desirable. Examples include a method of estimating the task being performed based on the state of the article in the image. According to this method, the task can be easily analyzed without using expensive sensors, etc. On the other hand, even when the task being performed changes, the tasks cannot be discriminated unless the state of the article changes.

For this problem, the processing system 1 according to the embodiment estimates the task being performed based not only on the state of the article but also on the work spot on the article. By using the work spot on the article in the estimation, the task being performed can be estimated with high accuracy even in a period in which the state of the article does not change. Also, even if there are multiple tasks that have the same work spots on the article, the tasks can be discriminated based on the state of the article. According to the embodiment, the task can be estimated in more detail and with higher accuracy.

Figure 31:
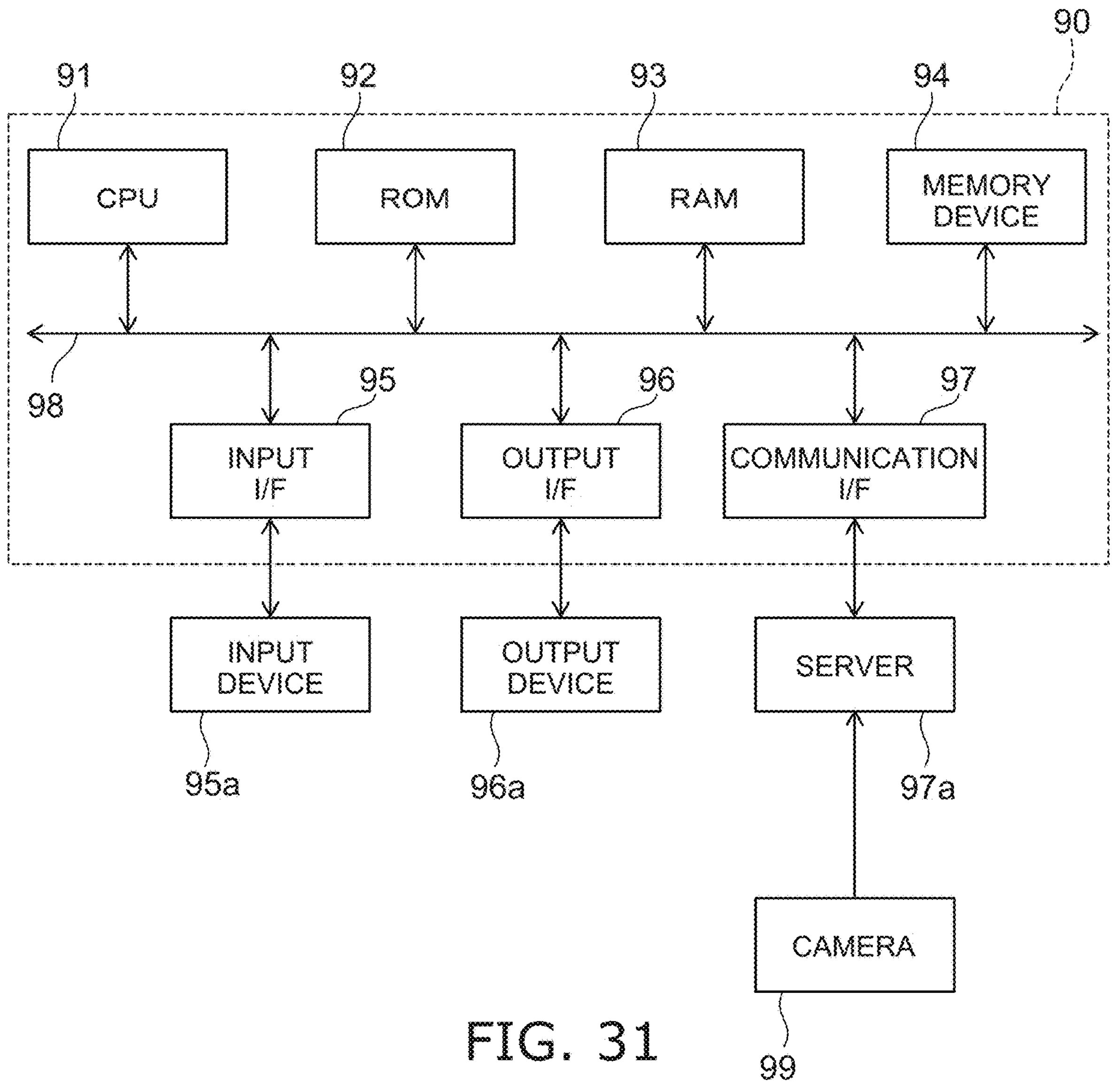
FIG. 31 is a schematic view showing a hardware configuration.

FIG. 31 is a schematic view showing a hardware configuration.

The processing device 20 includes, for example, the hardware configuration shown in FIG. 31. A computer 90 shown in FIG. 31 includes a CPU 91, ROM 92, RAM 93, a memory device 94, an input interface 95, an output interface 96, and a communication interface 97.

The ROM 92 stores programs that control the operations of the computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit data to the output device 96a via the output I/F 96 and cause the output device 96a to display an image.

The communication interface (I/F) 97 connects the computer 90 and a server 97a outside the computer 90. The communication I/F 97 is, for example, a network card such as a LAN card, etc. The CPU 91 can read various data from the server 97a via the communication I/F 97. A camera 99 images articles and stores the images in the server 97a.

The memory device 94 includes at least one selected from a hard disk drive (HDD) and a solid state drive (SSD). The input device 95a includes at least one selected from a mouse, a keyboard, a microphone (audio input), and a touchpad. The output device 96a includes at least one selected from a monitor, a projector, a speaker, and a printer. A device such as a touch panel that functions as both the input device 95a and the output device 96a may be used.

The memory device 94 can be used as the memory device 30. The camera 99 can be used as the imaging device 10.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the embodiments described above, a processing system, a processing method, a program, and a storage medium are provided in which a task can be estimated in more detail.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processing system configured to:
- estimate a pose of a worker, a position of an article, an orientation of the article, and a state of the article based on an image of the worker and the article;
- estimate a work spot of the worker on the article based on estimation results of the pose, the position, and the orientation;
- refer to a task database including a plurality of datasets, each of the plurality of datasets including a task, a state of the article in the task, and a work spot of the worker in the task; and
- estimate a task performed by the worker by comparing estimation results of the work spot and the state with the plurality of datasets,
- wherein estimating the work spot includes:
  - setting a plurality of gates on the article based on the estimated position and the estimated orientation, the plurality of gates corresponding to mutually separated regions on a surface of the article, and
  - estimating the work spot based on an intersection relationship between either a line segment indicating a body part of the worker or an extension of the line segment, and at least one of the plurality of gates, the body part at least including a lower arm of the worker, wherein
  - the line segment indicating the lower arm is a line segment connecting a wrist joint and an elbow joint, and
  - positions of the wrist joint and the elbow joint are acquired in the estimating the pose of the worker.

2. The system according to claim 1, wherein the estimation of the position and the orientation includes:
- extracting a partial region from the image, the partial region including the worker and the article;
- specifying a worker region based on the estimation result of the pose, the worker being imaged in the worker region;
- estimating an article region by removing the worker region from the partial region, the article being imaged in the article region; and
- estimating the position and the orientation by using the article region.

3. The system according to claim 2, wherein the estimation of the position and the orientation includes:
- estimating an outer edge of the article by using the article region; and
- estimating the position and the orientation by using at least a part of the outer edge.

4. The system according to claim 3, wherein the system is configured to extract, as the partial region, a region of movement between a plurality of the images.

5. The system according to claim 3, wherein the system is configured to:
- extract a plurality of the partial regions between the plurality of images;
- estimate a plurality of the outer edges by using the plurality of partial regions; and
- estimate the position and the orientation by using one of the plurality of outer edges.

6. The system according to claim 1, wherein the system is configured to cut out a part of the image including the article, and estimate the state by using the cut-out part of the image.

7. The system according to claim 1, wherein the estimation of the work spot includes:
- in a case where a body part of the worker, based on the estimation result of the pose, crosses one of the plurality of gates, estimating a position of the one of the plurality of gates as the work spot.

8. The system according to claim 1, wherein the system is configured to use a plurality of the images imaged at mutually-different times to estimate the task at each of the times.

9. The system according to claim 8, wherein the estimation of the task includes estimating the task performed in a prescribed period based on a plurality of the estimation results of the work spot in the prescribed period and a plurality of the estimation results of the state in the prescribed period.

10. A processing method causing a computer to:
- estimate a pose of a worker, a position of an article, an orientation of the article, and a state of the article based on an image of the worker and the article;
- estimate a work spot of the worker on the article based on estimation results of the pose, the position, and the orientation;
- refer to a task database including a plurality of datasets, each of the plurality of datasets including a task, a state of the article in the task, and a work spot of the worker in the task; and
- estimate a task performed by the worker by comparing estimation results of the work spot and the state with the plurality of datasets,
- wherein estimating the work spot includes:
  - setting a plurality of gates on the article based on the estimated position and the estimated orientation, and
  - estimating the work spot based on an intersection relationship between either a line segment indicating a body part of the worker or an extension of the line segment, and at least one of the plurality of gates.

11. A non-transitory computer-readable storage medium storing a program, the program causing the computer to execute the method according to claim 10.

12. The system according to claim 7, wherein in a case where the body part of the worker does not cross any of the plurality of gates and a line extending along the body part intersects one of the plurality of gates, a position of the one of the plurality of gates is estimated as the work spot.

13. The system according to claim 1, wherein:
- the task database includes a sequence of the plurality of tasks, and
- when the estimation results of the work spot and the state are compared with the plurality of datasets, the sequence and one or more previously estimated tasks are referred to.

14. A processing system configured to:
- estimate a pose of a worker, a position of an article, an orientation of the article, and a state of the article based on an image of the worker and the article;

estimate a work spot of the worker on the article based on estimation results of the pose, the position, and the orientation;

refer to a task database including a plurality of datasets, each of the plurality of datasets including a task, a state of the article in the task, and a work spot of the worker in the task; and estimate a task performed by the worker by comparing estimation results of the work spot and the state with the plurality of datasets, wherein estimating the work spot includes:

setting a plurality of gates on the article based on the estimated position and the estimated orientation, the plurality of gates corresponding to mutually separated regions on a surface of the article, and estimating the work spot based on an intersection relationship between either a line segment indicating a body part of the worker or an extension of the line segment, and at least one of the plurality of gates, the body part at least including a lower arm of the worker, wherein the plurality of gates include gates corresponding to a plurality of directions of the article.

15. The system according to claim 14, wherein the line segment indicating the lower arm is a line segment connecting a wrist joint and an elbow joint, and positions of the wrist joint and the elbow joint are acquired in the estimating the pose of the worker.

16. A processing system configured to:

estimate a pose of a worker, a position of an article, an orientation of the article, and a state of the article based on an image of the worker and the article;

estimate a work spot of the worker on the article based on estimation results of the pose, the position, and the orientation;

refer to a task database including a plurality of datasets, each of the plurality of datasets including a task, a state of the article in the task, and a work spot of the worker in the task; and estimate a task performed by the worker by comparing the estimated work spot and the estimated state with the plurality of datasets, wherein, when a plurality of candidate tasks correspond to the estimated work spot and the estimated state, estimating the task includes selecting one task from the plurality of candidate tasks based on a predefined execution sequence and one or more tasks estimated up to a current point in time, wherein estimating the task includes:

estimating a task performed in a prescribed period based on a plurality of estimation results of the work spot and the state within the prescribed period, outputting the estimated task as the task performed in the prescribed period, and repeatedly shifting the prescribed period by a predetermined amount of time.

17. The processing system of claim 16, wherein the prescribed period is a time window having a duration determined based on a standard time of a task following the estimated task in the execution sequence.

18. The processing system of claim 17, wherein outputting the estimated task includes outputting the estimated task when a ratio of the estimated task within the prescribed period exceeds a threshold.

* * * * *